US012533064B2

(12) United States Patent
Wang et al.

(10) Patent No.: US 12,533,064 B2
(45) Date of Patent: Jan. 27, 2026

(54) PHYSIOLOGICAL FEEDBACK FOR PREDICTIVE MODELS

(71) Applicant: Microsoft Technology Licensing, LLC, Redmond, WA (US)

(72) Inventors: Yu-Te Wang, Redmond, WA (US); Nemanja Djuric, Belgrade (RS); Ivan J. Tashev, Kirkland, WA (US); Raymond Michael Winters, Seattle, WA (US); Hannes Gamper, Seattle, WA (US); Dimitra Emmanouilidou, Woodinville, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 502 days.

(21) Appl. No.: 18/118,849

(22) Filed: Mar. 8, 2023

(65) Prior Publication Data
US 2024/0298946 A1    Sep. 12, 2024

(51) Int. Cl.
*G06F 40/274* (2020.01)
*A61B 5/16* (2006.01)
*A61B 5/291* (2021.01)

(52) U.S. Cl.
CPC .............. *A61B 5/168* (2013.01); *A61B 5/163* (2017.08); *A61B 5/291* (2021.01)

(58) Field of Classification Search
CPC ......... A61B 5/168; A61B 5/163; A61B 5/291; G06F 3/013; G06F 40/274; G06F 3/015; G06F 3/0236; G06F 3/0237; G06N 3/045; G06N 3/08; G06N 20/00
See application file for complete search history.

(56) References Cited

U.S. PATENT DOCUMENTS

| 11,640,204 | B2 | 5/2023 | Shenoy | |
|---|---|---|---|---|
| 12,061,738 | B2* | 8/2024 | Du | G06V 20/20 |
| 12,271,515 | B1* | 4/2025 | Yee | G06F 3/015 |
| 2006/0101079 | A1 | 5/2006 | Morikawa | |
| 2015/0149961 | A1 | 5/2015 | Karakotsios | |
| 2015/0177833 | A1 | 6/2015 | Vennstrm et al. | |

(Continued)

FOREIGN PATENT DOCUMENTS

| WO | 2009089532 A1 | 7/2009 |
|---|---|---|
| WO | 2022066476 A1 | 3/2022 |

OTHER PUBLICATIONS

International Search Report and Written Opinion received for PCT Application No. PCT/US2024/017189, May 22, 2024, 19 pages.

(Continued)

*Primary Examiner* — Ibrahim A Khan
(74) *Attorney, Agent, or Firm* — Rainier Patents, P.S.

(57) ABSTRACT

This document relates to employing biosignals to evaluate predictions made by predictive models. For example, user attention can be inferred from a user attention signal such as gaze. When the user directs attention to a prediction output by a given predictive model, a user reaction signal such as an electroencephalogram or pupillary diameter measurement can be processed to determine whether the user perceives an error. If the user perceives an error, an error indication can be output. Error indications can be used to evaluate the predictive model, replace predictions generated by the predictive model, train the predictive model, etc.

20 Claims, 17 Drawing Sheets

(56) References Cited

U.S. PATENT DOCUMENTS

| | | | |
|---|---|---|---|
| 2016/0170996 A1* | 6/2016 | Frank | G06F 16/904 |
| | | | 707/748 |
| 2017/0068418 A1 | 3/2017 | Tanaka | |
| 2017/0131766 A1* | 5/2017 | He | G06F 3/0304 |
| 2017/0168580 A1 | 6/2017 | Allen | |
| 2017/0285735 A1* | 10/2017 | Young | G06F 3/013 |
| 2017/0293402 A1* | 10/2017 | Morris | G06F 3/0482 |
| 2017/0346817 A1 | 11/2017 | Gordon | |
| 2018/0046851 A1 | 2/2018 | Kienzle et al. | |
| 2019/0034941 A1 | 1/2019 | Chavarria | |
| 2019/0046044 A1 | 2/2019 | Tzvieli | |
| 2020/0110862 A1 | 4/2020 | Derakhshani | |
| 2020/0364539 A1 | 11/2020 | Anisimov | |
| 2022/0206566 A1 | 6/2022 | Senkal | |
| 2023/0026513 A1 | 1/2023 | Kouider | |
| 2023/0047787 A1* | 2/2023 | Chappell, III | A61B 5/486 |
| 2023/0056020 A1 | 2/2023 | Zhang | |
| 2023/0120370 A1* | 4/2023 | Koll | G06F 3/013 |
| | | | 704/275 |
| 2023/0229246 A1 | 7/2023 | Gerhard | |
| 2023/0333628 A1* | 10/2023 | Magi | G06F 1/1686 |
| 2024/0053817 A1* | 2/2024 | Xu | H04N 13/398 |
| 2024/0310902 A1 | 9/2024 | Wang | |

OTHER PUBLICATIONS

International Search Report and Written Opinion received for PCT Application No. PCT/US2024/019286, Jun. 10, 2024, 16 pages.

Notice of Allowance mailed on Jun. 20, 2024, in U.S. Appl. No. 18/123,212, 09 pages.

Eoanou, Andrea, "Microsoft Editor Is Now Superpowered Using Context IQ to Help You Stay in the Flow of Your Work", Retrieved From: https://techcommunity.microsoft.com/t5/microsoft-365-blog/microsoft-editor-is-now-superpowered-using-context-iq-to-help/ba-p/2897180, Nov. 2, 2021, 8 Pages.

Abiri, et al., "A comprehensive review of EEG-based brain-computer interface paradigms," J. Neural Eng., vol. 16, No. 1, p. 011001, 2019, 22 pages.

Card, et al., "The psychology of human-computer interaction," Hillsdale, New Jersey, USA: Erlbaum, 1983, 48 pages.

Chiang et al., "A Closed-loop Adaptive Brain-computer Interface Framework: Improving the Classifier with the Use of Error-related Potentials," presented at the International IEEE/EMBS Conference on Neural Engineering, 2021, pp. 487-490.

Klingner, et al., "Measuring the task-evoked pupillary response with a remote eye tracker," in Proceedings of the 2008 symposium on Eye tracking research & applications, New York, NY, USA, 2008, pp. 69-72.

Kristensson, et al., "Design and Analysis of Intelligent Text Entry Systems with Function Structure Models and Envelope Analysis," in Proceedings of the 2021 CHI Conference on Human Factors in Computing Systems, May 2021, pp. 1-12.

Kruger, et al., "Measuring the impact of subtitles on cognitive load: eye tracking and dynamic audiovisual texts," in Proceedings of the 2013 Conference on Eye Tracking South Africa, Aug. 2013, pp. 62-66.

Macknik, et al., "Neuronal correlates of visibility and invisibility in the primate visual system," Nat Neurosci, vol. 1, No. 2, Jun. 1998, pp. 144-149.

Mehdizadeh, et al., "EEG and Eye-Tracking Error-Related Responses During Predictive Text Interactions: A BCI Case Study," in 2023 45th Annual International Conference of the IEEE Engineering in Medicine & Biology Society (EMBC), Jul. 2023, pp. 1-4.

Palin, et al., "How do People Type on Mobile Devices? Observations from a Study with 37,000 Volunteers," in Proceedings of the 21st International Conference on Human-Computer Interaction with Mobile Devices and Services, Oct. 2019, pp. 1-12.

Peirce, et al., "PsychoPy2: Experiments in behavior made easy," Behav Res, vol. 51, Feb. 2019, pp. 195-203.

An, et al., "Decoding auditory and tactile attention for use in an EEG-based brain-computer interface," In 2020 8th International Winter Conference on Brain-Computer Interface (BCI), IEEE, pp. 1-6, 2020.

"Notice of Allowance Issued in U.S. Appl. No. 18/123,212", Mailed Date: Oct. 27, 2023, 11 Pages.

Chavarriaga, et al., "Learning from EEG Error-Related Potentials in Noninvasive Brain-Computer Interfaces," in IEEE Transactions on Neural Systems and Rehabilitation Engineering, vol. 18, Aug. 2010, pp. 381-388.

Ferrez, et al., "Error-Related EEG Potentials Generated During Simulated Brain-Computer Interaction," in IEEE Transactions on Biomedical Engineering, vol. 55 No. 3, pp. 923-929, Mar. 2008.

Holroyd, et al., "The Neural Basis of Human Error Processing: Reinforcement Learning, Dopamine, and the Error-Related Negativity," Psychol Rev, vol. 109, No. 4, pp. 679-709, 2002.

Notice of Allowance mailed on Nov. 17, 2023, in U.S. Appl. No. 18/123,212, 7 pages.

Salazar-Gomez, et al., "Correcting robot mistakes in real time using EEG signals," 2017 IEEE International Conference on Robotics and Automation (ICRA), Singapore, 9 Pages, 2017.

U.S. Appl. No. 18/123,212, filed Mar. 8, 2023, 33 Pages.

Vasiljevic, et al., "Brain-Computer Interface Games Based on Consumer-Grade EEG Devices: A Systematic Literature Review," International Journal of Human-Computer Interaction, vol. 36, No. 2, Jan. 2020, 38 pages.

Zander, et al., "Towards passive brain-computer interfaces: applying brain-computer interfacehuman-machine systems in general," Journal of Neural Engineering, vol. 8, Issue No. 2, Mar. 2011, 5 pages.

International Preliminary Report on Patentability (Chapter I) received for PCT Application No. PCT/US2024/017189, mailed on Sep. 18, 2025, 13 pages.

International Preliminary Report on Patentability (Chapter I) received for PCT Application No. PCT/US2024/019286, mailed on Oct. 2, 2025, 10 pages.

* cited by examiner

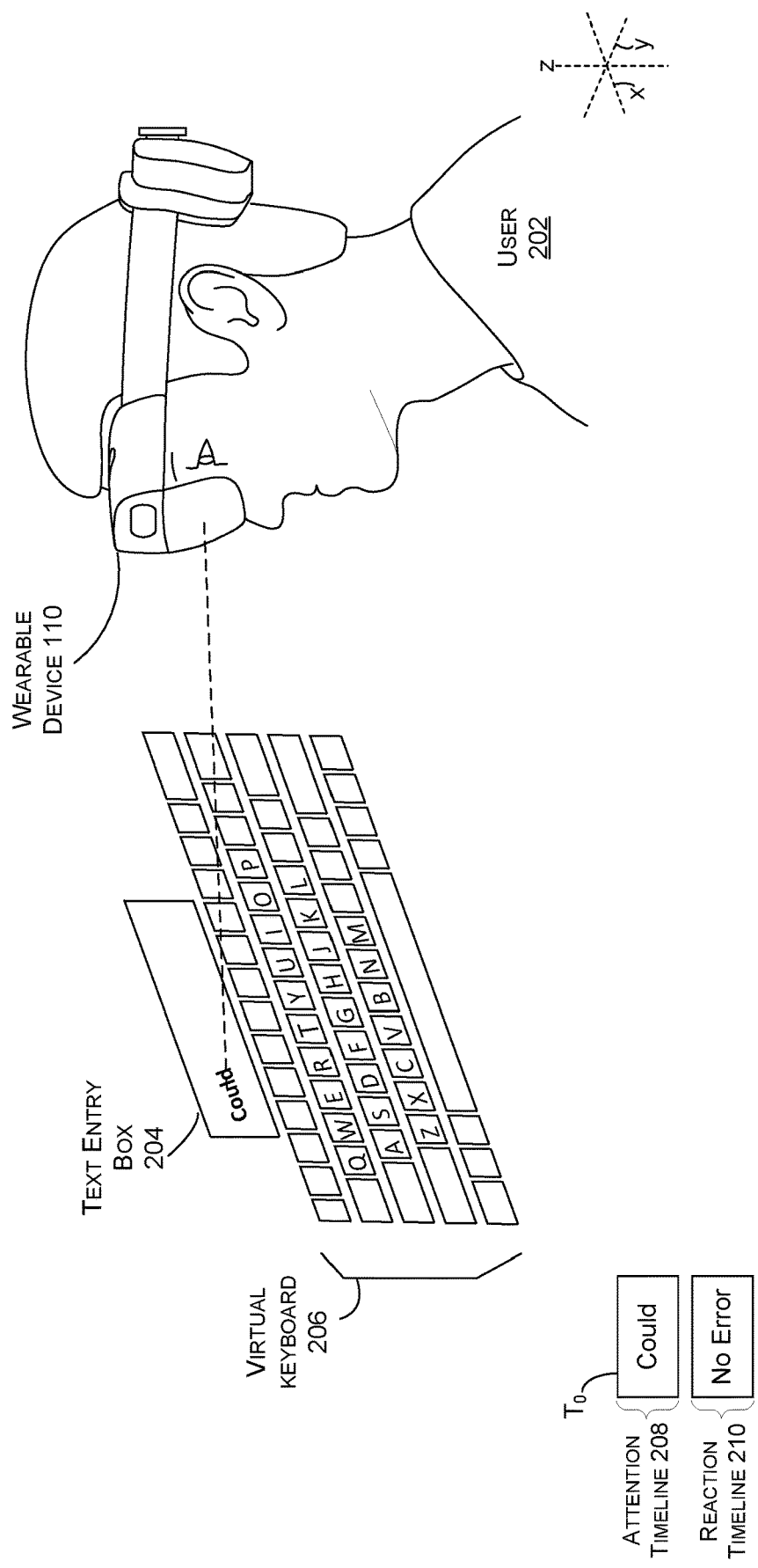

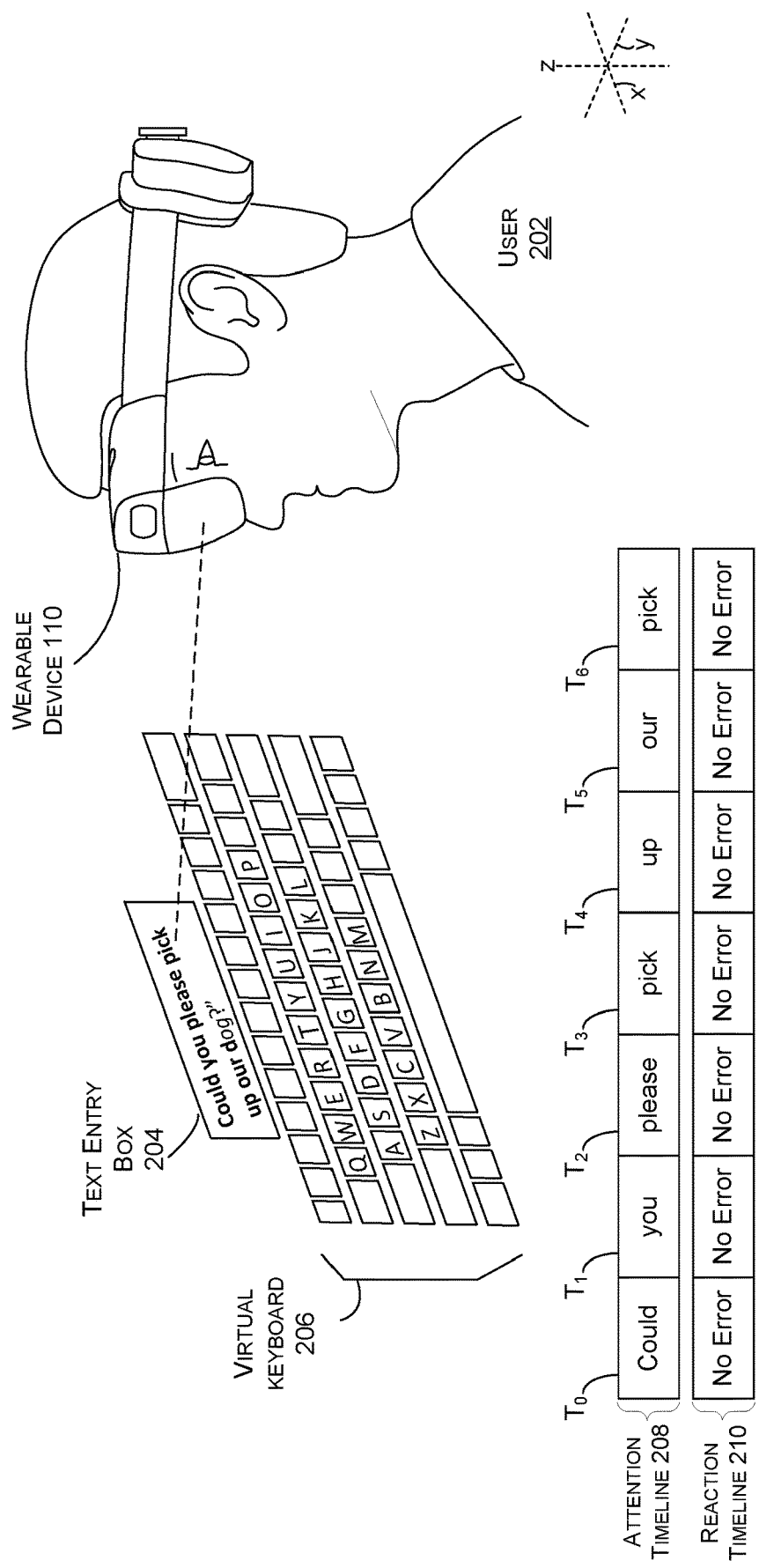

PHYSIOLOGICAL FEEDBACK FOR PREDICTIVE MODELS

BACKGROUND

One important use case for computing technologies involves inferring user intent and outputting content that a user is predicted to be interested in based on the inferred intent. For instance, predictive text models can be employed to suggest the next word in a sentence to a user, or search engines can predict suggested queries that a user might want to use to search for documents. However, in some cases, predictive models generate incorrect suggestions, which can cause users to lose trust in the models and, in some cases, stop using them altogether.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The description generally relates to techniques for employing physiological feedback to evaluate predictions made by predictive models. One example relates to a method or technique that can include receiving a user attention signal conveying where a user directs attention over a period of time. The method or technique can also include, based on the user attention signal, identifying a particular time when the user directs attention to a prediction output by a predictive model. The method or technique can also include receiving a user reaction signal conveying a physiological reaction of the user to the prediction. The method or technique can also include determining whether the physiological reaction indicates that the user perceives an error responsive to directing attention to the prediction. The method or technique can also include, in an instance when the physiological reaction indicates that the user perceives an error responsive, outputting an error indication.

Another example includes a system that can include a processor and a storage medium. The storage medium can store instructions which, when executed by the processor, cause the system to output a prediction and receive an error indication indicating that a user perceives an error in the prediction. The error indication can be based on a user attention signal indicating that the user directs attention to the prediction at a particular time and a user reaction signal indicating that the user perceives an error responsive to directing attention to the prediction. The instructions can also cause the system to, based on the error indication, replace the prediction with another prediction.

Another example includes a computer-readable storage medium storing instructions which, when executed by a computing device, cause the computing device to perform acts. The acts can include receiving a user attention signal conveying where a user directs attention over a period of time. The acts can also include, based on the user attention signal, identifying a particular time when the user directs attention to a prediction output by a predictive model. The acts can also include receiving a user reaction signal conveying a physiological reaction of the user to the prediction. The acts can also include determining whether the physiological reaction indicates that the user perceives an error responsive to directing attention to the prediction. The acts can also include, in an instance when the physiological reaction indicates that the user perceives an error responsive, outputting an error indication.

The above-listed examples are intended to provide a quick reference to aid the reader and are not intended to define the scope of the concepts described herein.

BRIEF DESCRIPTION OF THE DRAWINGS

The Detailed Description is described with reference to the accompanying figures. In the figures, the left-most digit(s) of a reference number identifies the figure in which the reference number first appears. The use of similar reference numbers in different instances in the description and the figures may indicate similar or identical items.

FIGS. 2A-2I illustrate an example application scenario over a period of time, consistent with some implementations of the present concepts.

DETAILED DESCRIPTION

Figure 1:
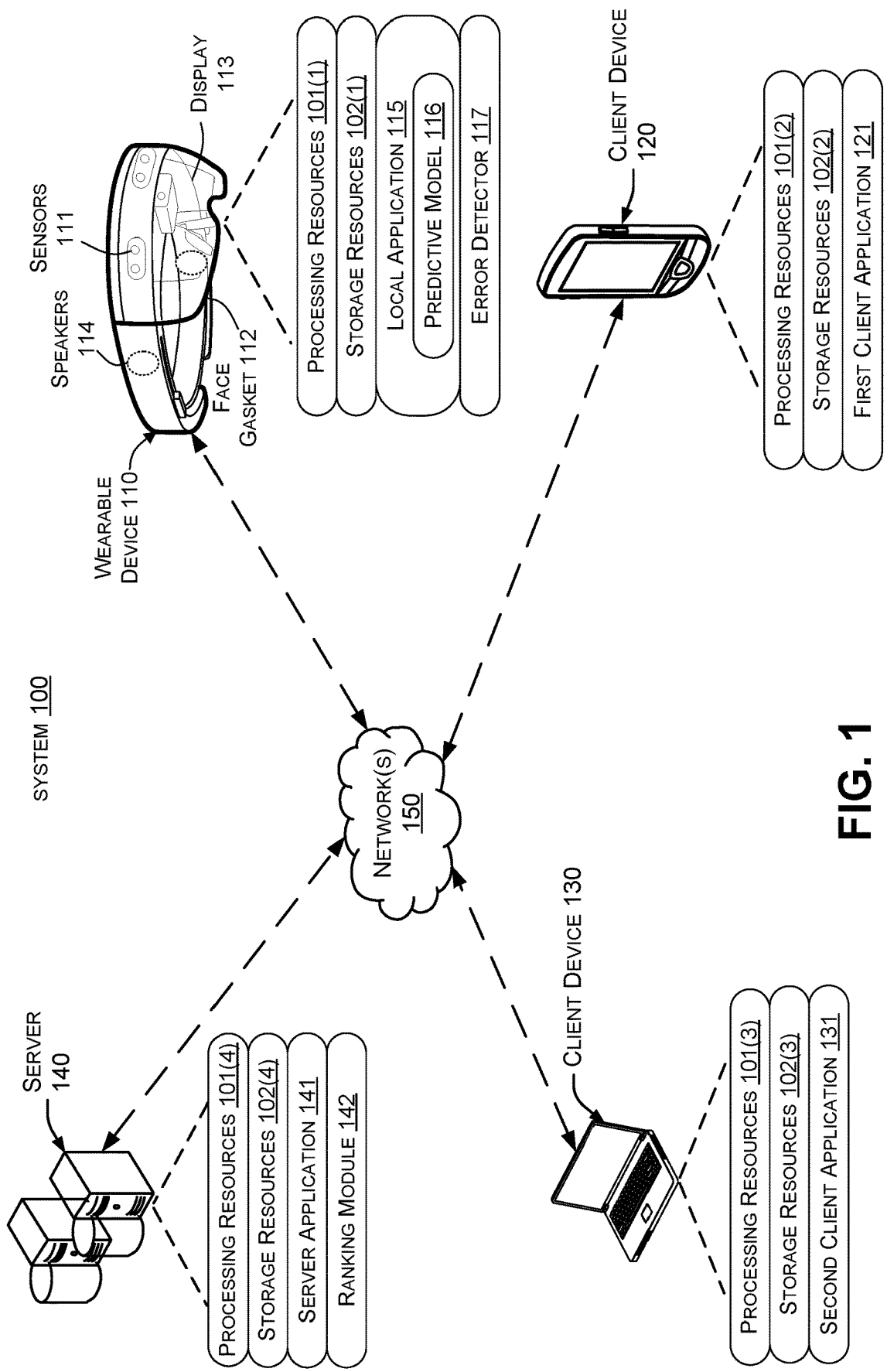
FIG. 1 illustrates an example system, consistent with some implementations of the present concepts.

As noted previously, predictive models enjoy widespread usage in various applications. For instance, predictive text models can help users write words, or other predictive models can be employed to help disambiguate user inputs such as mouse or cursor locations. However, predictive models are not perfect and occasionally make incorrect predictions.

One way to improve a predictive model is to refine the model using training data, where explicit user confirmation of predictions output by a given model can be considered a positive training example and explicit user rejection of a predicted output can be considered a negative example. However, this approach requires users to affirmatively label each training example, which is time-consuming and expensive. Furthermore, this type of training is typically done offline, so users do not benefit from model improvements until the model is retrained and released again. Even if training is performed online using explicit user feedback, model parameters generally take some time to converge sufficiently that a user will notice improvement.

Another type of user feedback is implicit feedback. For instance, users subconsciously react to various external stimuli in a manner that can be sensed without requiring the user to provide explicit feedback. For instance, biosignals such as electroencephalogram ("EEG") signals or changes in pupil diameter can provide insights into how users perceive a given prediction output by a predictive model.

Some biosignals convey implicit neurological feedback, which generally occurs in a short window after a user perceives an external stimulus, e.g., one second. For instance, if a user is shown a predicted word on the screen, the user's reaction can be captured within approximately the next second after the word is displayed. Thus, in research scenarios, biosignals such as EEG or pupillary diameter are typically "locked" to the stimulus by capturing those signals in a short window after the stimulus is output to the user.

However, in many practical computing scenarios, users are presented with a wide range of content and the output of a given predictive model is interspersed with other computer-generated content. In addition, unlike in research settings, in the real-world users also have external stimuli, such as barking dogs or crying children, constantly changing their neurophysiological state. Thus, it is not always possible to disambiguate whether a user's physiological reaction at a given time is caused by the output of a predictive model or by other stimuli, such as other computer-generated content or real-world occurrences.

The disclosed implementations employ a user attention signal to determine whether a user's attention is directed to a given prediction output by a predictive model. Then, user reaction signals are temporally and/or spatially correlated with the user attention signal, e.g., to determine which portion of the user reaction signals are responsive to the user's attention being focused on the prediction output by the model. Thus, noisy physiological reactions directed to other stimuli can be filtered out. The filtered physiological reactions can be employed for various purposes, such as real-time feedback to a given predictive model, obtaining training data for updating the predictive model, and/or for ranking various predictive models relative to one another.

Definitions

For the purposes of this document, the term "user attention signal" refers to any type of signal that can be used to infer whether a user is directing their attention to a prediction output by a computer. For instance, one type of user attention signal is a user gaze signal indicating that a user is gazing at a particular prediction. Other examples of user attention signals can convey spatial attention, auditory, or tactile attention, as discussed further below. The term "user reaction signal" refers to any type of signal that can be used to infer whether a user believes that an error is present in a particular prediction. For instance, a user reaction signal could be an EEG signal, a pupil diameter measurement, etc., that conveys the physiological reaction of a user to a particular stimulus. The term "biosignal" refers to any signal that can be used to determine the physiological reaction of a user to a stimulus, e.g., by measuring a user's body. Biosignals can be employed both as user attention signals and as user reaction signals, as described further herein.

An "application" is a computing program, e.g., that responds to commands from a user. An application can be a virtual reality application that immerses the user entirely or almost entirely in a virtual environment. An application can also be an augmented reality application that presents virtual content in a real-world setting. Other examples of applications include productivity applications (e.g., word processing, spreadsheets), video games, digital assistants, teleconferencing applications, email clients, web browsers, operating systems, Internet of Things (IoT) applications, etc.

The term "model" is used generally herein to refer to a range of processing techniques, and includes models trained using machine learning as well as hand-coded (e.g., heuristic-based) models. For instance, as noted below, a machine-learning model could be a deep neural network, a support vector machine, a decision tree, a random forest, etc. Models can be employed for various purposes as described below, such as classification of physiological reactions into a first classification indicating that a user does not perceive an error and a second classification indicating that the user perceives an error.

Example System

The present concepts can be implemented in various application scenarios and on various devices. FIG. 1 shows an example system 100 in which the present implementations can be employed, as discussed below.

As shown in FIG. 1, system 100 includes a wearable device 110, a client device 120, a client device 130, and a server 140, connected by one or more network(s) 150. Note that the client devices can be embodied both as mobile devices such as smart phones or tablets, as well as stationary devices such as desktops, server devices, etc. Likewise, the servers can be implemented using various types of computing devices. In some cases, any of the devices shown in FIG. 1, but particularly the server, can be implemented in data centers, server farms, etc.

Certain components of the devices shown in FIG. 1 may be referred to herein by parenthetical reference numbers. For the purposes of the following description, the parenthetical (1) indicates an occurrence of a given component on wearable device 110, (2) indicates an occurrence of a given component on client device 120, (3) indicates an occurrence on client device 130, and (4) indicates an occurrence on server 140. Unless identifying a specific instance of a given component, this document will refer generally to the components without the parenthetical.

Generally, the devices 110, 120, 130, and/or 140 may have respective processing resources 101 and storage resources 102, which are discussed in more detail below. The devices may also have various modules that function using the processing and storage resources to perform the techniques discussed herein. The storage resources can include both persistent storage resources, such as magnetic or solid-state drives, and volatile storage, such as one or more random-access memory devices. In some cases, the modules are provided as executable instructions that are stored on persistent storage devices, loaded into the random-access memory devices, and read from the random-access memory by the processing resources for execution.

Wearable device 110 can include one or more sensors 111, which provide information about the location and/or movement of a user of the device (e.g., the user's head, eyes, facial muscles, etc.). The sensors can be internal and/or external. One specific type of sensor is an EEG sensor that monitors electrical signals reflecting brain activity. An EEG sensor can be worn around the scalp, in a headband, behind the ear, inside the ear (e.g., in an earbud), etc. Another type of sensor is an inertial measurement unit ("IMU") configured to provide acceleration, gyroscopic, and/or magnetic measurements. In some cases, an IMU can be provided in a face gasket 112 of the wearable device, which can surround display 113. In other cases, the IMU can be provided in smart headphones, earbuds, a cochlear implant, or in any other location where tongue movements can be detected. Other types of sensors can include photoplethysmography (PPG) sensors, position tracking sensors, eye tracking sensors that can determine where a user is gazing and/or measure pupil diameter, etc. Note that some sensors may be provided separately and are not necessarily components of the wearable device. For instance, external sensors can communicate sensor data to the wearable device using wired or wireless (e.g., Bluetooth) communication links.

Visual content can be presented on the display 113 of the wearable device 110, and sound can be output using one or more speakers 114. The wearable device can also include a local application 115, which includes a predictive model 116. The local application can receive predictions from the predictive model and output the predictions via the display, speakers, etc. The error detector 117 can obtain user attention signals and user reaction signals from the sensors, and temporally correlate the user reaction signals to the user attention signals. Based on the correlating, the error detector can evaluate the predictions, e.g., by identifying a portion of a given reaction signal that occurs after the user directs their attention to a given prediction. If the evaluating indicates that the user perceives an error in the prediction, the error detector can output an error indication to the local application, which can output another prediction for the user to consider.

In some cases, the wearable device can interact with remote applications as well. For instance, the user may use the wearable device 110 to interact with a first client application 121 on client device 120 and with a second client application 131 on client device 130. For instance, the user can control their personal devices such as phones, tablets, laptops, etc., over a local wireless connection. The user may also use the wearable device to interact with a server application 141, e.g., over a wide-area network. In some cases, the server can include a ranking module 142 that can rank different predictive models based on errors detected by the error detector 117 on the wearable device.

Note that FIG. 1 illustrates just one potential configuration and that the concepts conveyed herein can be employed in a wide range of other configurations. For example, in some cases, error detection can be performed remotely from the wearable device 110, e.g., on a remote server or on a companion device, such as a tablet, phone, or laptop in communication with the wearable device. In other cases, predictive models can be hosted remotely on servers or companion devices.

Example Application Scenario

Figure 2B:
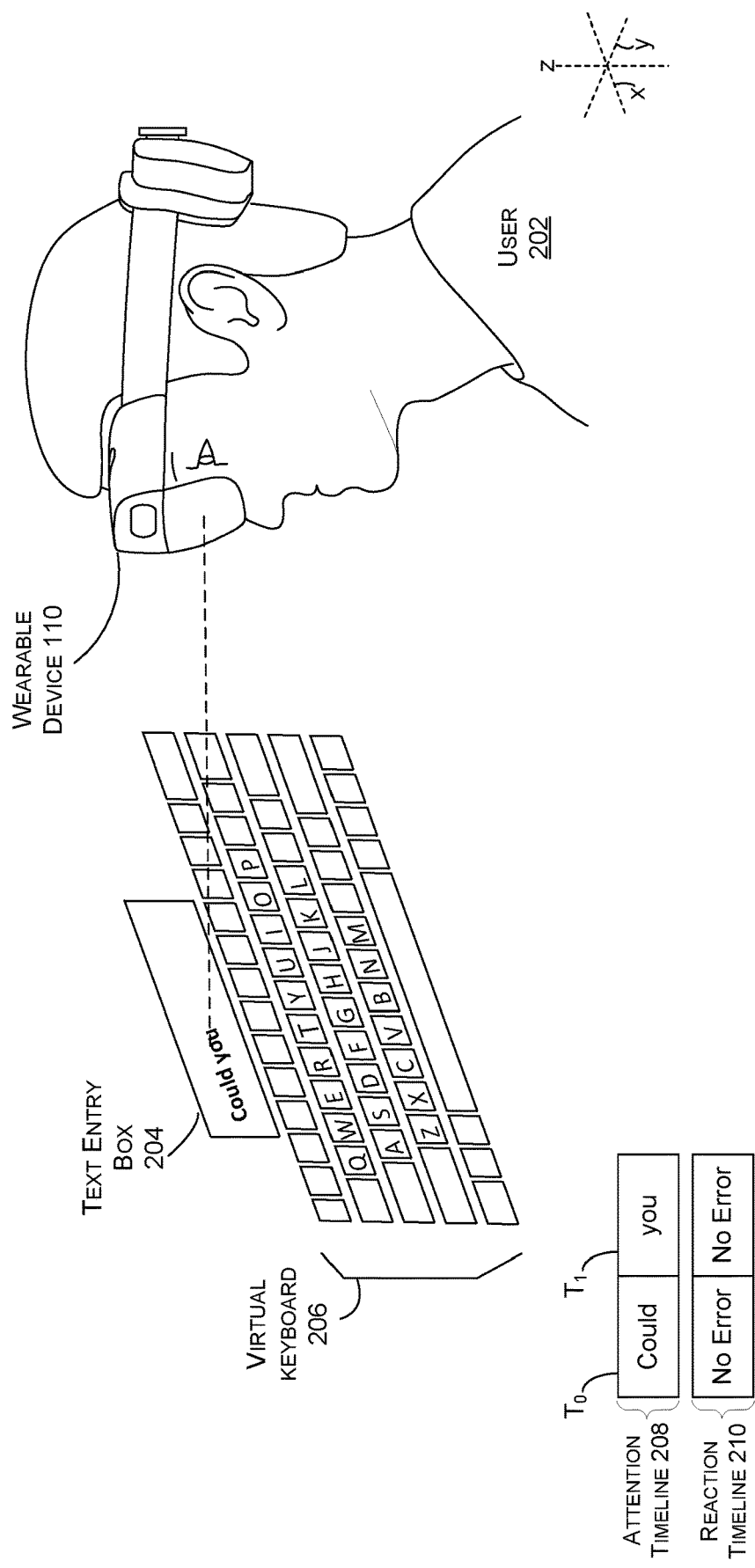

FIGS. 2A through 2I illustrate an example application scenario 200 that conveys how user attention and reaction signals can be correlated to identify when a user perceives an error in a prediction. As shown in FIG. 2A, user 202 wearing wearable device 110 is shown a text entry box 204 which can receive text entered by a virtual keyboard 206. The user can scan with their eyes over individual letters of the virtual keyboard. As the user scans, gaze tracking using one or more sensors can be employed to determine which letter the user's gaze is directed toward, and that letter can be visually distinguished (e.g., bolded, enlarged, etc.) to inform the user which letter they have currently targeted. When the user reaches the letter they wish to enter, they can perform a specific gesture (e.g., a button press on a handheld controller, a facial gesture, a hand gesture, etc.).

FIGS. 2A through 2I illustrate an example where the user wants to enter the phrase "Could you please pick up our daughter?" into the text entry box 204. Attention timeline 208 shows where the user's attention (e.g., gaze) is directed over a sequence of time windows, and reaction timeline 210 shows whether the user's reaction indicates an error in each time window (e.g., as determined from an EEG signal, pupil measurement, or other user reaction signal).

As shown in FIG. 2A, the first word entered by the user is the word "could." This word could be typed entirely by the user, or automatically completed by a predictive text model after the user enters one or more characters. The user's attention (e.g., gaze) is directed to the word "could" as shown in time window $T_0$, and the user reaction for time window $T_0$ indicates no error, e.g., either the user correctly typed the word "could" or the predictive model accurately predicted that the user wanted to enter the word "could."

Moving to FIG. 2B, the next word entered by the user is the word "you." Again, this word could be typed entirely by the user, or automatically completed by a predictive text model. The user's attention is focused on the word "you" as shown in time window $T_1$, and the user reaction for time window $T_1$ indicates no error.

Figure 2C:
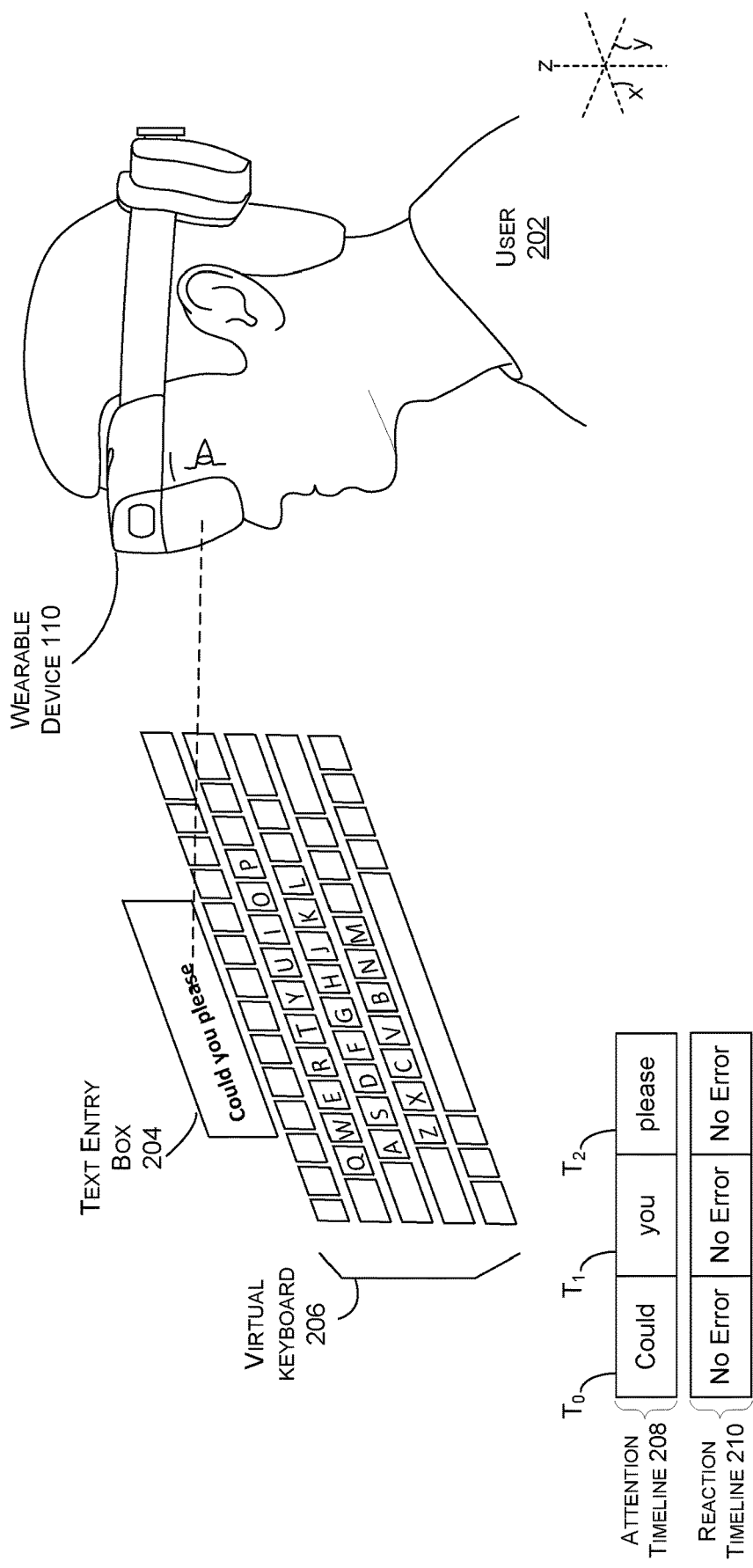

Moving to FIG. 2C, the next word entered by the user is the word "please." Again, this word could be typed entirely by the user, or automatically completed by a predictive text model. The user's attention is focused on the word "please" as shown in time window $T_2$, and the user reaction for time window $T_2$ indicates no error.

Figure 2D:
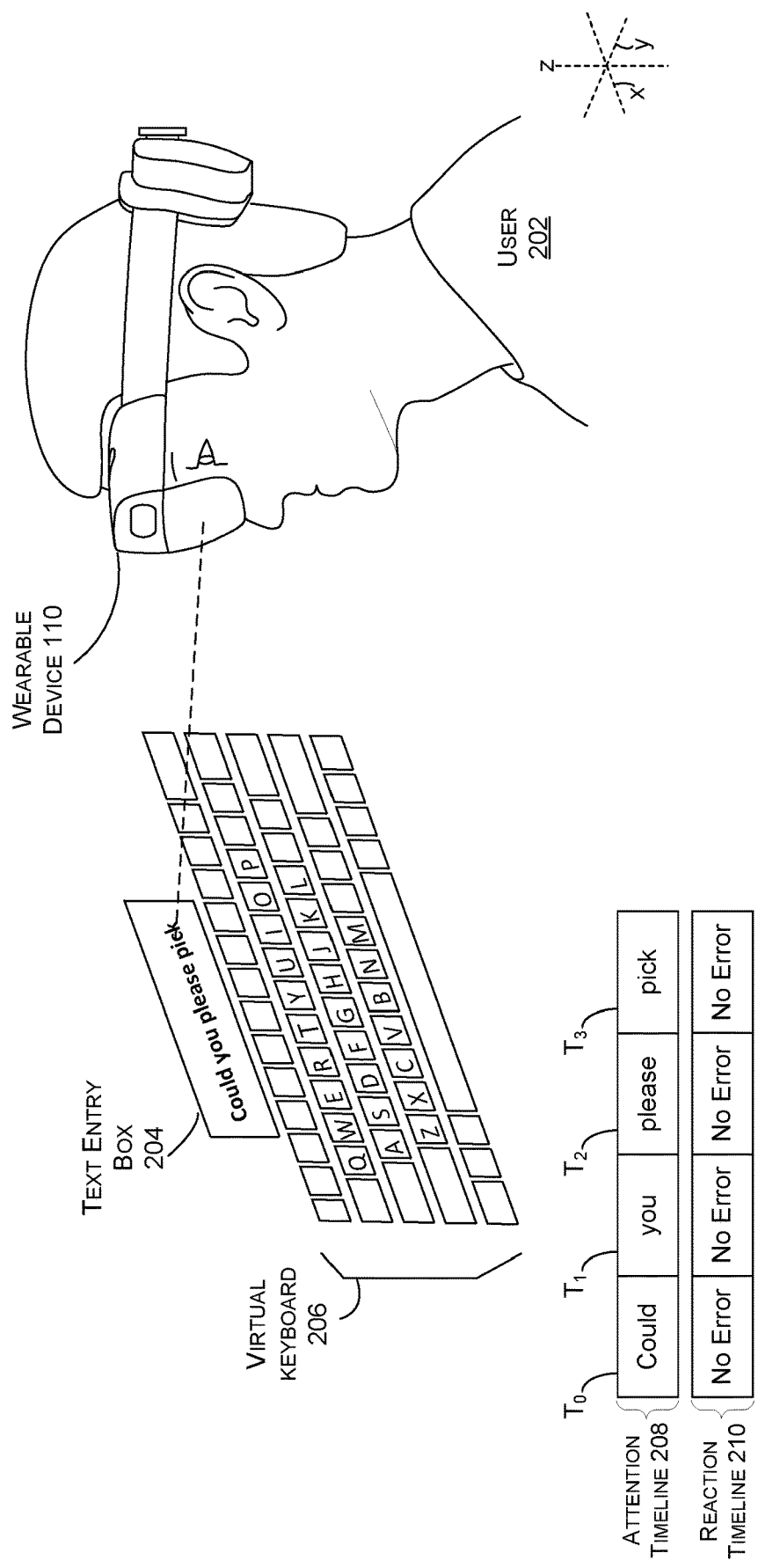

Moving to FIG. 2D, the next word entered by the user is the word "pick." Again, this word could be typed entirely by the user, or automatically completed by a predictive text model. The user's attention is focused on the word "pick" as shown in time window $T_3$, and the user reaction for time window $T_3$ indicates no error.

Figure 2E:
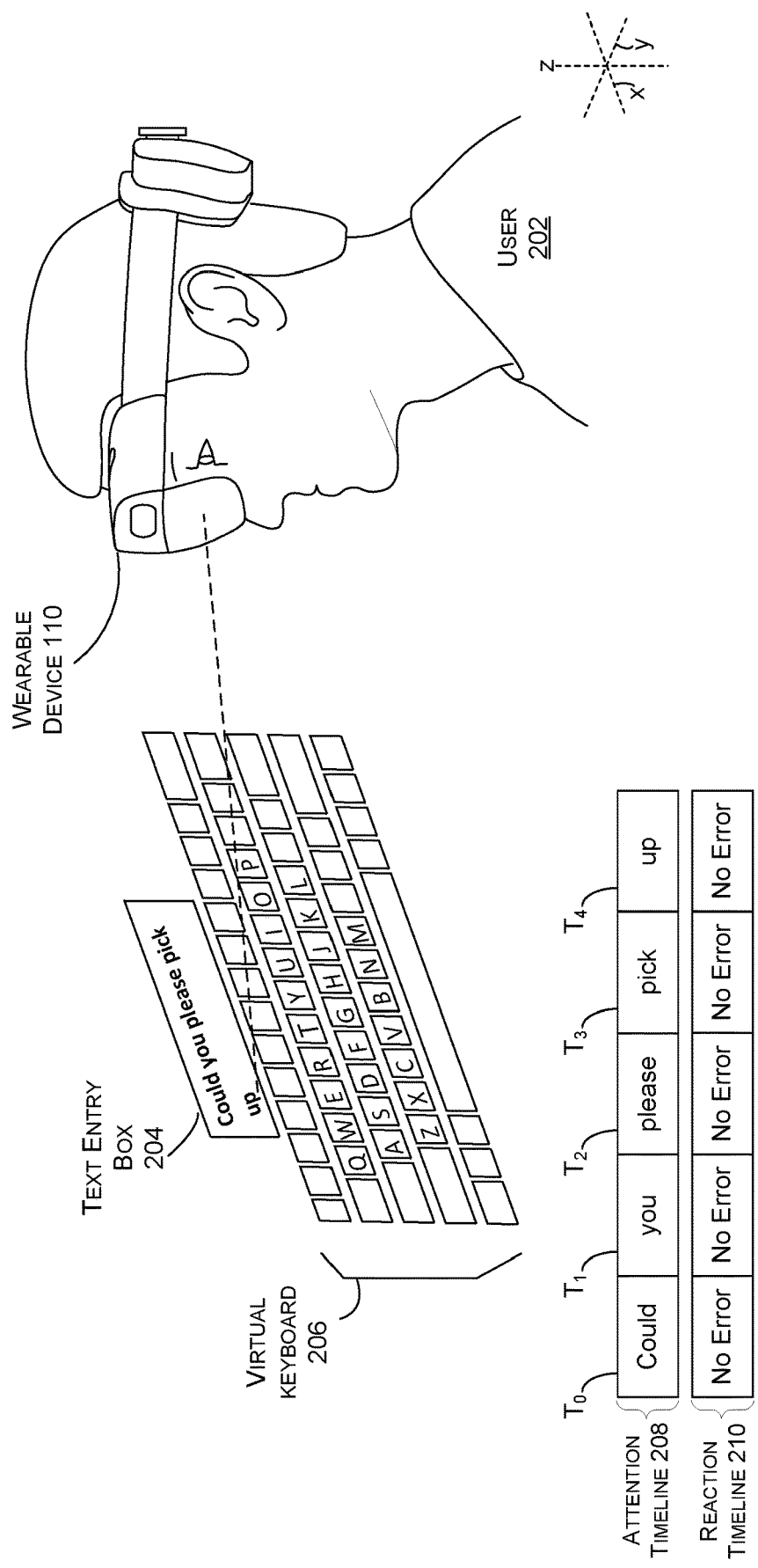

Moving to FIG. 2E, the next word entered by the user is the word "up." Again, this word could be typed entirely by the user, or automatically completed by a predictive text model. The user's attention is focused on the word "up" as shown in time window $T_4$, and the user reaction for time window $T_4$ indicates no error.

Figure 2F:
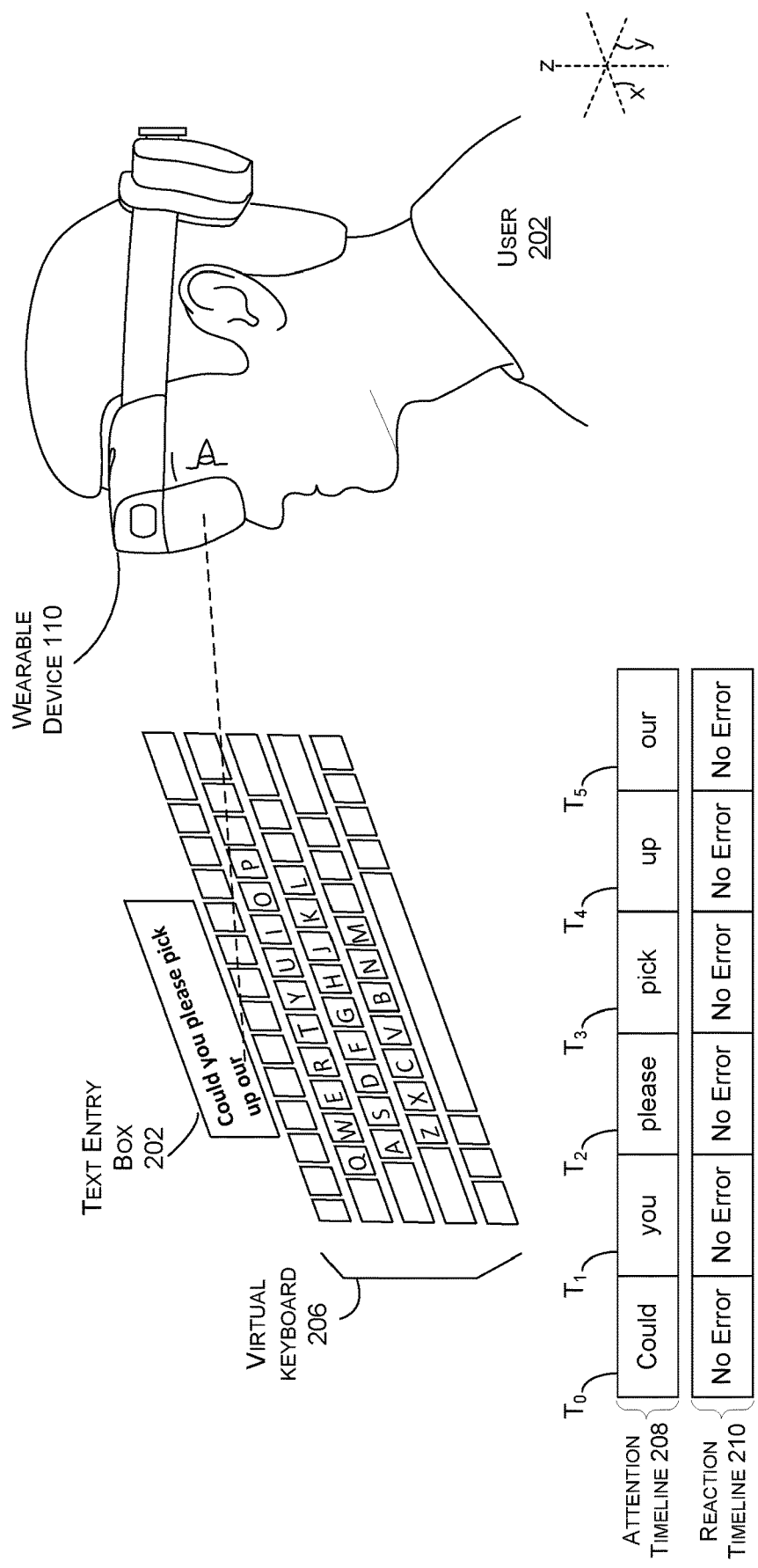

Moving to FIG. 2F, the next word entered by the user is the word "our." Again, this word could be typed entirely by the user, or automatically completed by a predictive text model. The user's attention is focused on the word "our" as shown in time window $T_5$, and the user reaction for time window $T_5$ indicates no error.

Moving to FIG. 2G, the user has entered the letter "d" and the predictive text model suggests the word "dog." However, as indicated in time window $T_6$ of the attention timeline, the user's attention is directed to the word "pick," e.g., the user may be reviewing the text they have already entered rather than looking at the word suggested by the predictive text model. The reaction timeline 210 indicates no error for time window $T_6$, as the user is satisfied that the word "pick" is correctly entered.

Figure 2H:
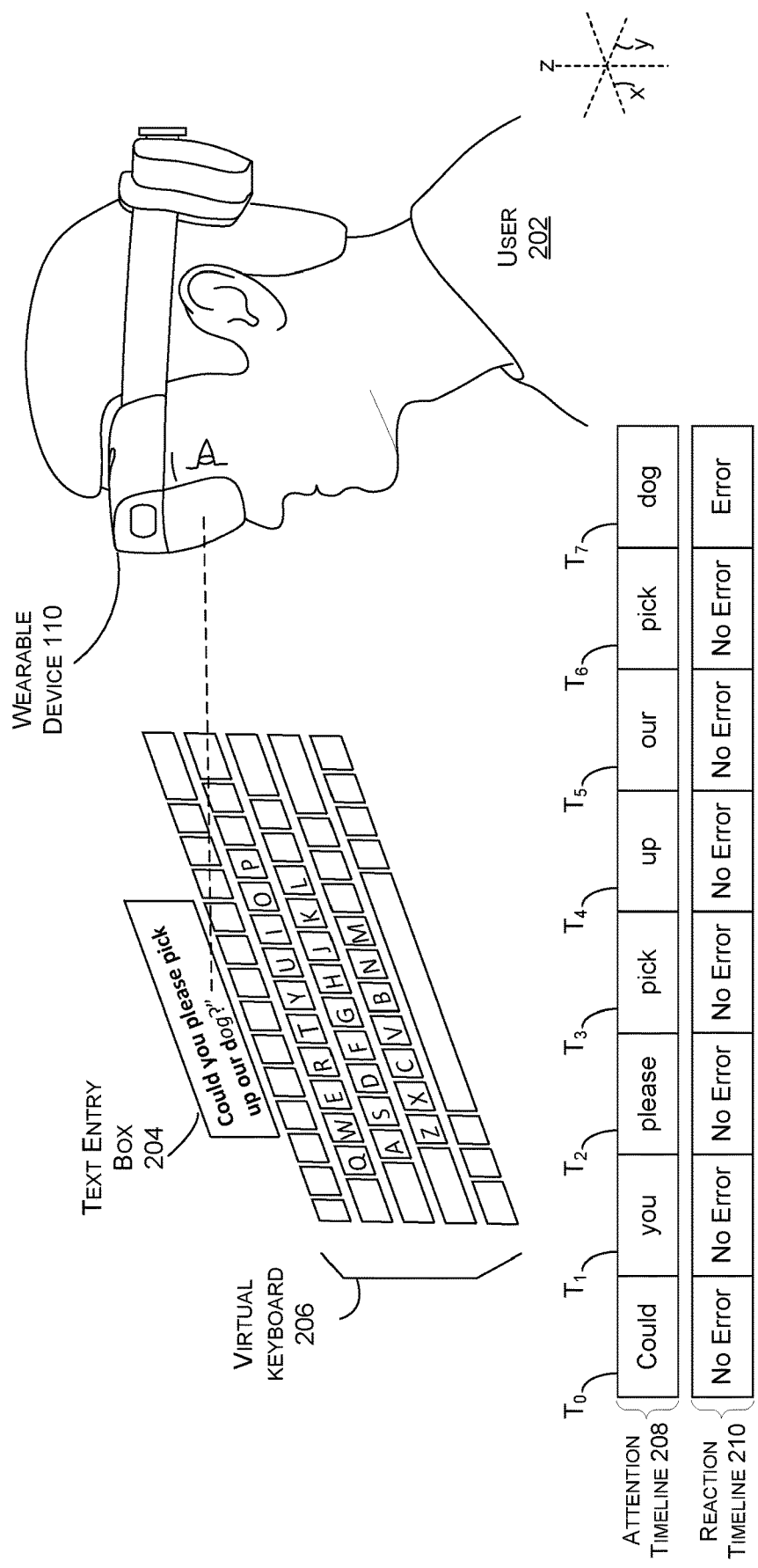

Moving next to FIG. 2H, the user's attention is now directed to the suggested word "dog," as indicated in attention timeline 208 for time window $T_7$. However, as noted previously, the user's intent is to enter the word "daughter," not "dog." Thus, as indicated in reaction timeline 210, the user perceives an error in the suggested word.

Figure 2I:
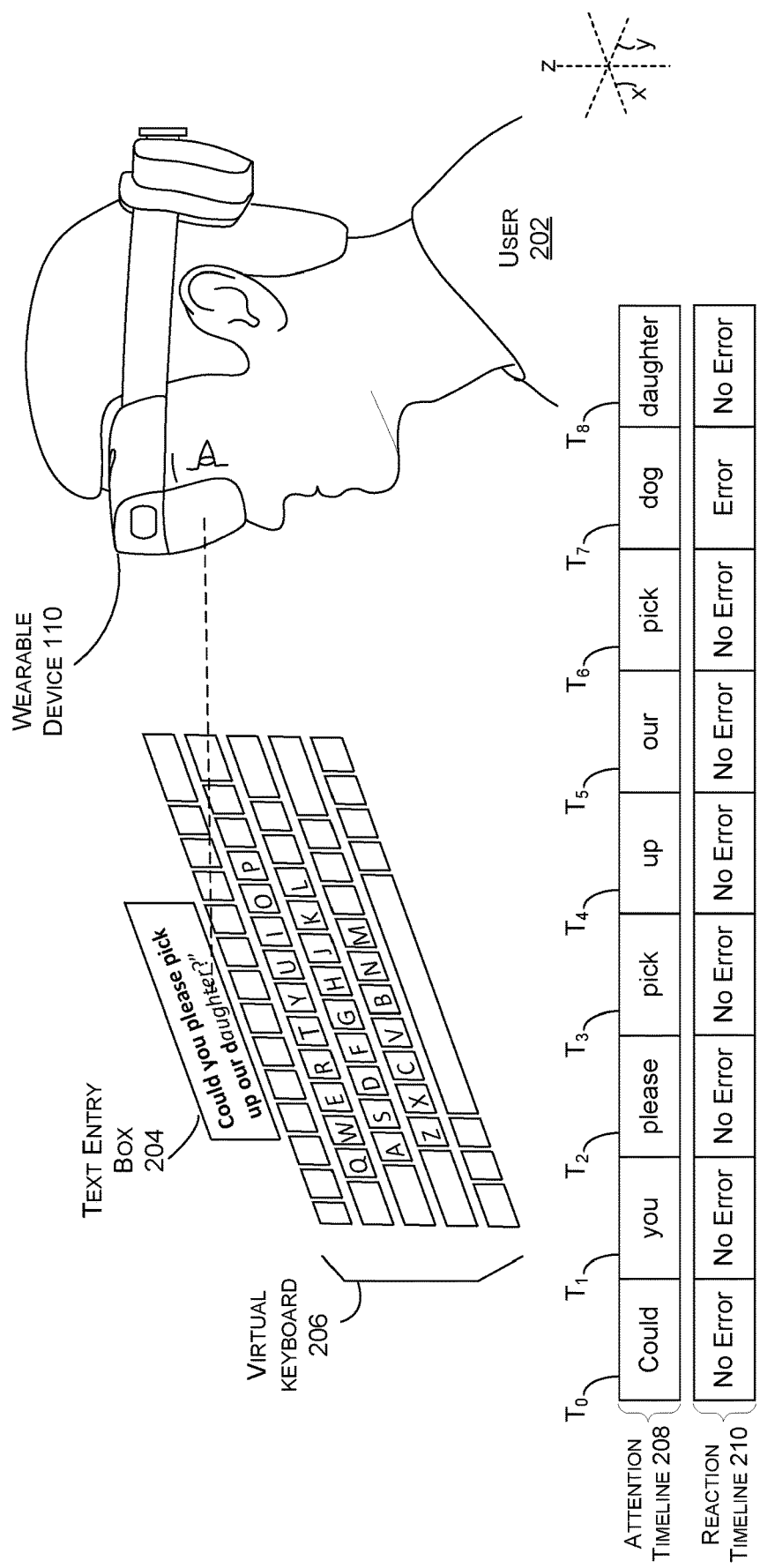

Moving next to FIG. 2I, the predictive text model has output another suggestion, the word "daughter." The user's attention is focused on the word "daughter" as shown in the attention timeline for time window $T_8$. The user's reaction indicates no error as shown in the reaction timeline for time window $T_8$. Thus, the word "daughter" remains on the screen rather than being replaced by another suggestion.

Referring back to FIGS. 2G and 2H, note the following. Consider an alternative implementation that evaluates user reaction to the suggested word "dog" when the suggestion is displayed in time window $T_6$, rather than waiting until time window $T_7$ when the user's attention is directed to the suggested word. Because the reaction timeline indicates no error for time window $T_6$, this could create an incorrect inference that the user actually wants to enter the word "dog." Instead, by correlating the user's reaction to the word "dog" with their attention on the word "dog," the user's actual reaction to the word "dog" is inferred during time window $T_7$. As a consequence, appropriate steps such as suggesting a different word to the user can be taken.

As a further point, note that FIGS. 2A-2I adopt a simplifying assumption that each time window is of an equal length. In practice, users may spend different amounts of time directing attention to different words or other items. Further, note that FIGS. 2H and 2I also adopt the simplifying assumption that the user's attention remains directed to the word "dog" for the entirety of time window $T_7$. In practice, a user reaction signal indicating an error can be identified in a time window (e.g., of one second) occurring after the user directs attention to the word "dog," even if the user directs their attention elsewhere during that time window. Said another way, when a user reaction indicating an error occurs with a specified amount of time after directing their attention to a prediction, an inference can be made that the user's reaction is responsive to the prediction rather than to some other computer-generated or real-world stimulus. Thus, if the user's attention is directed to the word "dog" at the beginning of time window $T_7$, the user's reaction for the rest of the time window is inferred to be a response to the word "dog."

Example Prediction Evaluation Method

Figure 3:
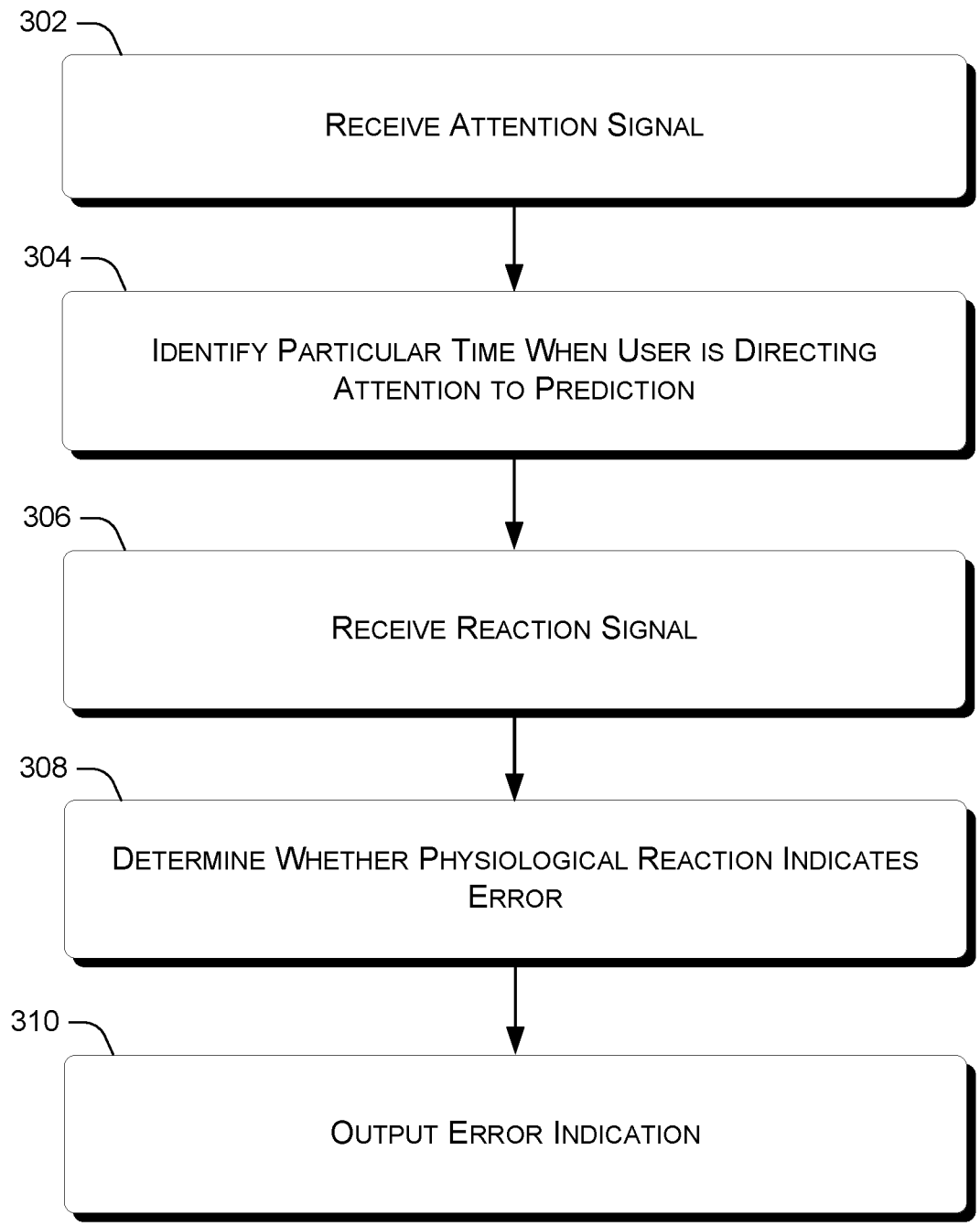
FIGS. 3 and 4 illustrate example methods or techniques, consistent with some implementations of the present concepts.

FIG. 3 illustrates an example method 300, consistent with some implementations of the present concepts. Method 300 can be implemented on many different types of devices, e.g., by one or more wearable devices, by one or more cloud servers, by one or more client devices such as laptops, tablets, or smartphones, or by combinations of one or more wearable devices, servers, client devices, etc.

Method 300 begins at block 302, where a user attention signal is received. The user attention signal can convey where a user's attention is directed over a period of time. For instance, the user attention signal can be obtained from an eye tracking sensor, and used to determine where a user's gaze is directed over the period of time (e.g., time windows T0 through $T_8$). The user attention signal can be processed to identify particular items at which the user's attention is directed at different times. For instance, the user's attention could be directed at computer-generated items such as words, animations, graphical icons, augmented or virtual reality content, or real-world items such as other humans, animals, vehicles, trees, furniture, etc.

Method 300 continues at block 304, where the user attention signal is employed to identify a particular time when the user is directing attention to a prediction output by a predictive model. For instance, as shown above in FIG. 2H, the user's attention is directed to the prediction "dog" during time window $T_7$.

Method 300 continues at block 306, where a user reaction signal is received that conveys a physiological reaction of the user to the prediction. For instance, the user reaction signal can be obtained from sensors such as EEG sensors, pupillary diameter measurements, etc. In some cases, the reaction signal is sampled continuously over a longer period of time, and a portion of the reaction signal occurring within a specified time window (e.g., one second) is extracted, starting at the time when the user directs their attention to the prediction. In other cases, sampling of the reaction signal is initiated when the user directs their attention to the prediction for the specified window of time.

Method 300 continues at block 308, where it is determined whether the physiological reaction indicates that the user perceives an error responsive to directing attention to the prediction. For instance, as shown above in FIG. 2H, the user's reaction indicates an error during time window $T_7$, after the user directs their attention toward the prediction "dog." One way to identify an error in a user reaction signal is to determine whether a specified time window (e.g., one second) occurring after the user directs attention to the prediction includes an error-related potential. Other ways to identify errors include determining whether the user's pupillary diameter increases above a specified percentage (e.g., a threshold).

Method 300 continues at block 310, where an error indication is output indicating that the user perceives an error in the prediction. For instance, the error indication can be output to an application that employs the predictive model to generate predictions. In some cases, the application can obtain another prediction from the predictive model, e.g., as shown in FIG. 2I by the prediction "daughter" in time window $T_8$.

In some cases, method 300 can be performed partly or entirely by error detector 117 locally on wearable device 110. In other cases, part or all of the evaluation is performed by a different computing device. For instance, any of client device 120, client device 130, and/or server 140 can receive attention and reaction signals to evaluate predictions.

Example Prediction Replacement Method

Figure 4:
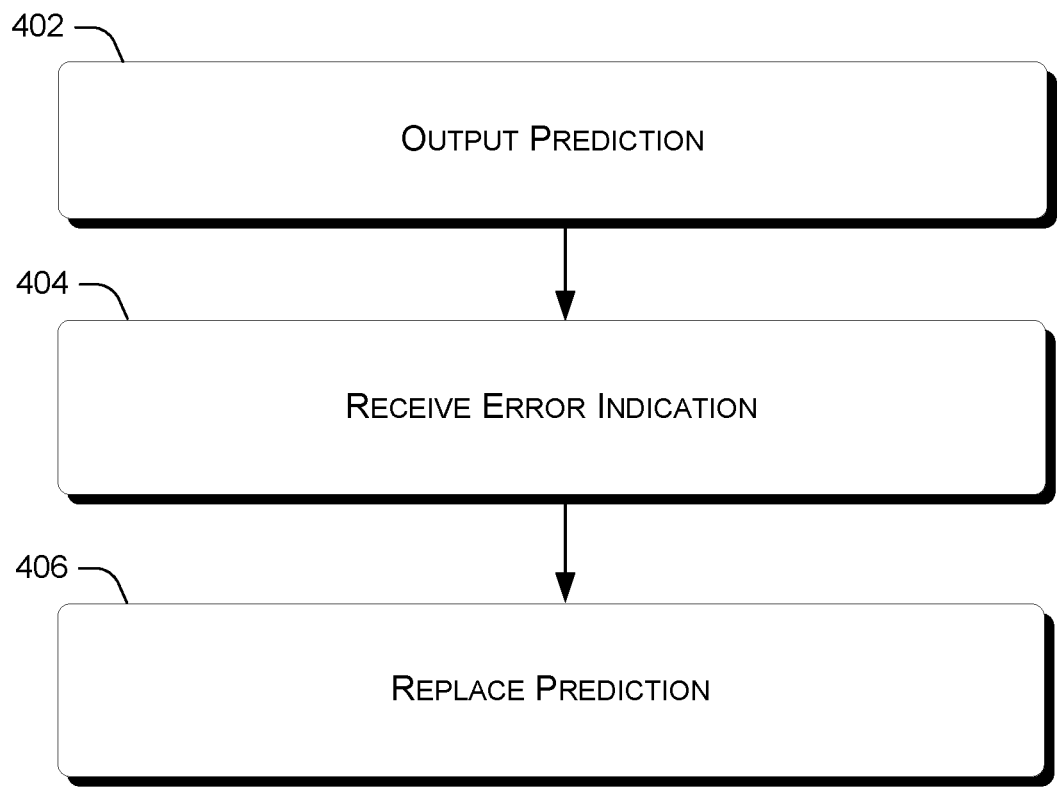

FIG. 4 illustrates an example method 400, consistent with some implementations of the present concepts. Method 400 can be implemented on many different types of devices, e.g., by one or more wearable devices, by one or more cloud servers, by one or more client devices such as laptops, tablets, or smartphones, or by combinations of one or more wearable devices, servers, client devices, etc.

Method 400 begins at block 402, where a prediction is output. For instance, an application can output a prediction received from a predictive model, such as the word "dog" shown in FIG. 2H. The prediction can be based on previous user input, such as the other words already entered by the user as well as the first letter "d" of the predicted word.

Method 400 continues at block 404, where an error indication is received. For instance, the application can receive an error indication from an error detector. The error indication can be based on a user attention signal indicating that a user is directing attention to the prediction at a particular time and a user reaction signal indicating that the user perceives an error responsive to directing attention to the prediction.

Method 400 continues at block 406, where the prediction is replaced with another prediction. For instance, the application can replace the word "dog" with the prediction "daughter," as shown in FIG. 2I. In some cases, the predictions can be output in an order based on a corresponding score assigned by the predictive model (e.g., a generative text model). For instance, if the predictive model gives the word "dog" a highest score of 0.6, the word "daughter" a next-highest score of 0.2, the word "diapers" a next-highest score of 0.15, and the word "drapes" a lowest score of 0.05, the application can start with the word "dog" as the highest-scoring prediction, then move to the word "daughter" as the next highest-scoring prediction, and so on until no error indication is received for a given prediction.

In some cases, method 400 can be performed partly or entirely by local application 115 on wearable device 110. In other cases, part or all of the method is performed by a different module and/or a different computing device. For instance, any of client device 120, client device 130, and/or server 140 can perform method 400.

Experimental Results

Experiments were conducted using a simulated predictive text generation interface where participants type sentences into the interface. The sentences participants type into the interface were experimentally controlled, and the text "predictions" participants encounter as they are typing were generated pseudo-randomly under certain criteria chosen to mimic real interactions of real predictive text systems. 450 common English sentences, ranging 4-8 words long, are adapted from an in-lab dataset. The spaCy Python library was employed to identify 1) nouns, verbs, adjectives, and adverbs in each sentence that are 2) more than three letters long, and that are 3) not the first word of the sentence. These words are the set of possible correct ("match") generations made by the simulated predictive text environment. For some trials, the environment may instead generate incorrect ("mismatch") words, which are selected from a set of different words of the same part of speech.

Data Acquisition

Ten healthy adults, fluent in English and with normal or corrected-to-normal vision, participated in the following experiment. A 32-channel EEG was recorded using the Brain Products LiveAmp system with active gel electrodes at a sampling rate of 500 Hz, and eye tracking data using a screen-mounted Tobii Pro Nano at a sampling rate of 60 Hz. During the experiment, participants sit at a desk in front of a computer monitor approximately 24 inches away. A standard QWERTY keyboard is positioned in front of them, and their head is supported by a chin rest. Participants are not informed that the system is not a real predictive text algorithm.

Figure 5:
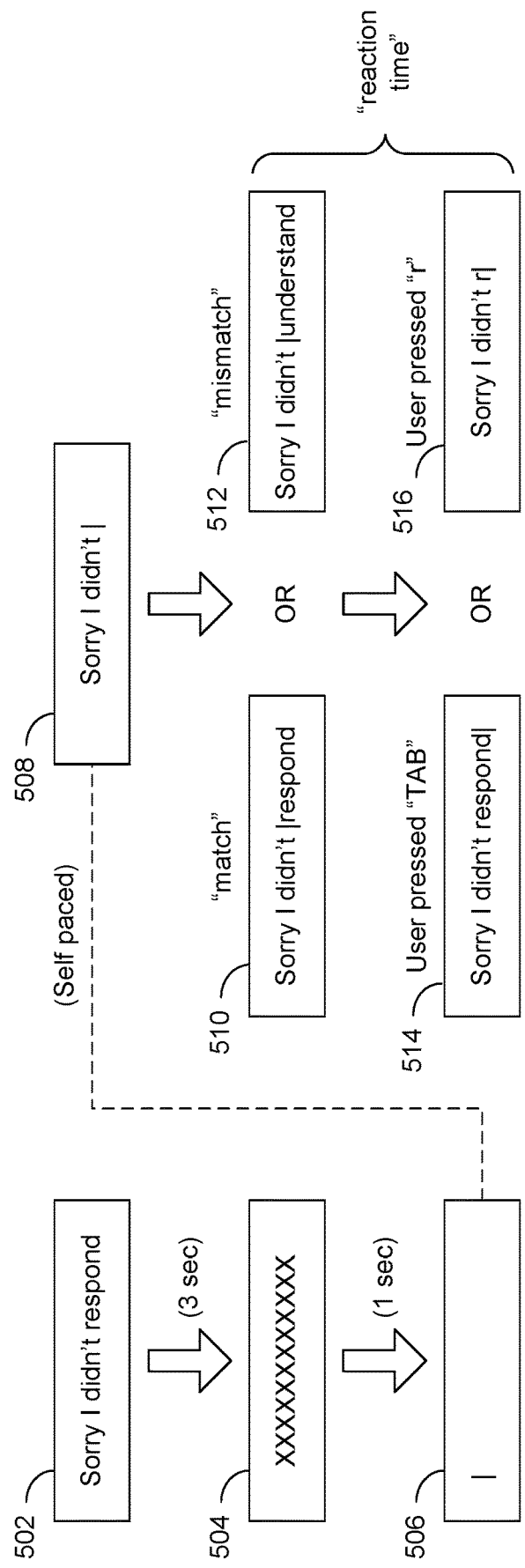
FIG. 5 illustrates an example experimental workflow, consistent with some implementations of the present concepts.

FIG. 5 shows an experimental workflow 500. At the start of each trial, one of the 450 stimulus sentences 502 is displayed inside an un-editable textbox for three seconds, then a visual mask 504 is applied for one second. Once the mask disappears, a cursor 506 is shown, and participants type the target sentence 508. For each trial, the experiment script randomly selects one suitable position in the sentence (defined above) to generate a "prediction" as the participant is typing. Approximately 50% of the time the generated word will be a match 510 for what the participant is attempting to type, while the other 50% of the time the word will be a mismatch 512. Participant behavior following text generation is governed by one of three possible "user scenarios" given to participants at the start of each run:

Dependent (reliant): Participants evaluate if the prediction is correct, and if so, always press TAB 514 to accept the prediction. If incorrect, then the users reject the prediction by continuing to type the correct phrase 516.

Independent (not reliant): Participants still observe generated predictions, but reject them all and type the word themselves, even if the prediction is correct.

Free choice: Participants decide for themselves how they would like to use (or not use) the predictive text.

Each participant completed three runs (50 sentences per run) under each user scenario (3 runs×3 scenarios=9 runs total). Participants are instructed to keep their typing speed and pattern consistent regardless of the user scenario.

Data Analysis

Bad trials, including system lag >100 msec in displaying the visual stimulus or participants not engaging with the text generation as instructed, were removed from analysis. From the logged keystrokes, participant reaction time (RT) was calculated for each trial as the time between text generation appearing on the screen to the next key press. EEG data are notch filtered at 60, 120, 180, and 240 Hz to remove powerline noise, and bandpass filtered from 1-10 Hz. EEG channels are re-referenced to an average reference. One epoch is extracted from each trial, starting 100 msec prior to text generation and ending 1000 msec after text generation. Only the epochs from channel "Fz" were examined. Error-related potential ("ErrP") can be characterized by fronto-central midline channels. (Holroyd et al., "The neural basis of human error processing: reinforcement learning, dopamine, and the error-related negativity," Psychol Rev, vol. 109, no. 4, pp. 679-709, 2002; Chavarriaga et al., "Learning From EEG Error-Related Potentials in Noninvasive Brain-Computer Interfaces," in IEEE Transactions on Neural Systems and Rehabilitation Engineering, 2010, vol. 18, pp. 381-388; Ferrez et al., "Error-Related EEG Potentials Generated During Simulated Brain-Computer Interaction," in IEEE Transactions on Biomedical Engineering, 2008, vol. 55, pp. 923-929.)

From the recorded eye tracking features, pupil diameter measurements are preprocessed by a moving average filter with a 50-msec window size. One epoch is extracted from each trial, starting 100 msec prior to text generation and ending 2000 msec after text generation. Bad trials identified from the behavioral analysis, and epochs where more than 500 msec of eye tracking data are missing are discarded from both physiological analyses. Three participants' data are excluded due to excessive EEG artifacts. Any missing datapoints in the remaining valid eye tracking epochs are linearly interpolated. From the cleaned eye tracking data, participants' percent change in pupil diameter (PCPD) was calculated at each timepoint, t, using their average pupil diameter across all runs (u) as their baseline. For example, the PCPD for participant p is provided below:

$$PCPD_p(t) = \frac{\text{Pupil } diam_p(t) - \mu_p}{\mu_p} * 100\% \quad (1)$$

Reaction Time

Figure 6:
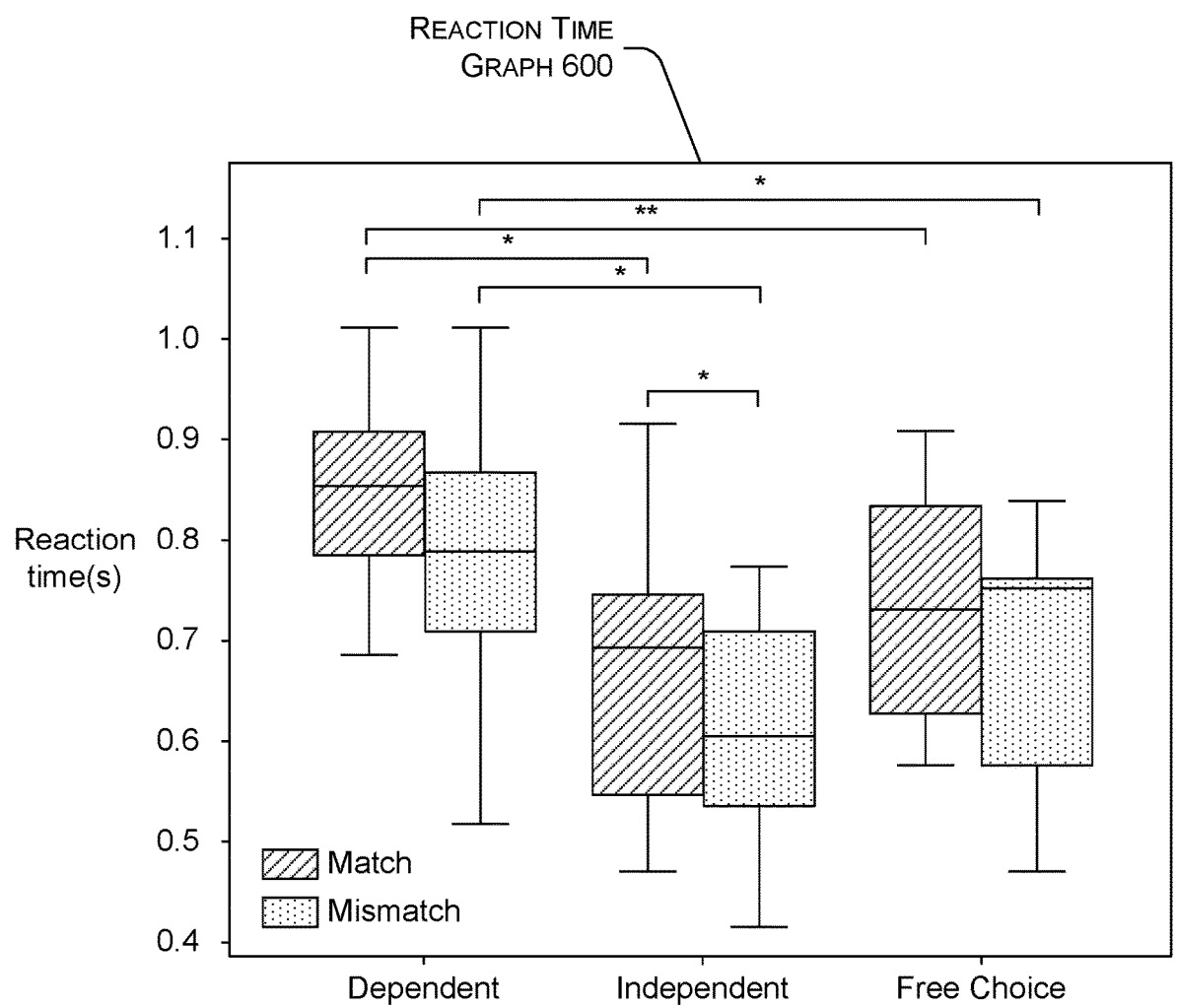
FIGS. 6, 7, 8, 9A, and 9B illustrate experimental results, consistent with some implementations of the present concepts.

FIG. 6 shows a reaction time graph 600, which conveys average RTs within match and mismatch conditions of the three user scenarios for each participant. A two-way repeated measures analysis of variance test or ("ANOVA") reveals significant overall effect on RT of the user scenario [$F(2,16)=11.89$, $p<0.001$] and whether the generated word is a match or mismatch to the target sentence [$F(1,8)=13.73$, $p=0.006$], with no significant interaction effects [$F(2,16)=0.49$, $p=0.621$]. When participants are heavily relying (dependent) on the predictive text, their response patterns can be clearly distinguished from when they are not relying [match: $t(8)=3.28$, $p=0.045$; mismatch: $t(8)=4.48$, $p=0.010$], or only partially relying [match: $t(8)=4.72$, $p=0.009$; mismatch: $t(8)=3.14$, $p=0.045$], on the system. Furthermore, trends suggest that participants have faster RTs to incorrect compared to correct text generations across all user scenarios [dependent: $t(8)=2.56$, $p=0.067$; independent: $t(8)=3.64$, $p=0.020$; free choice: $t(8)=2.26$, $p=0.067$].

EEG ErrP

Figure 7:
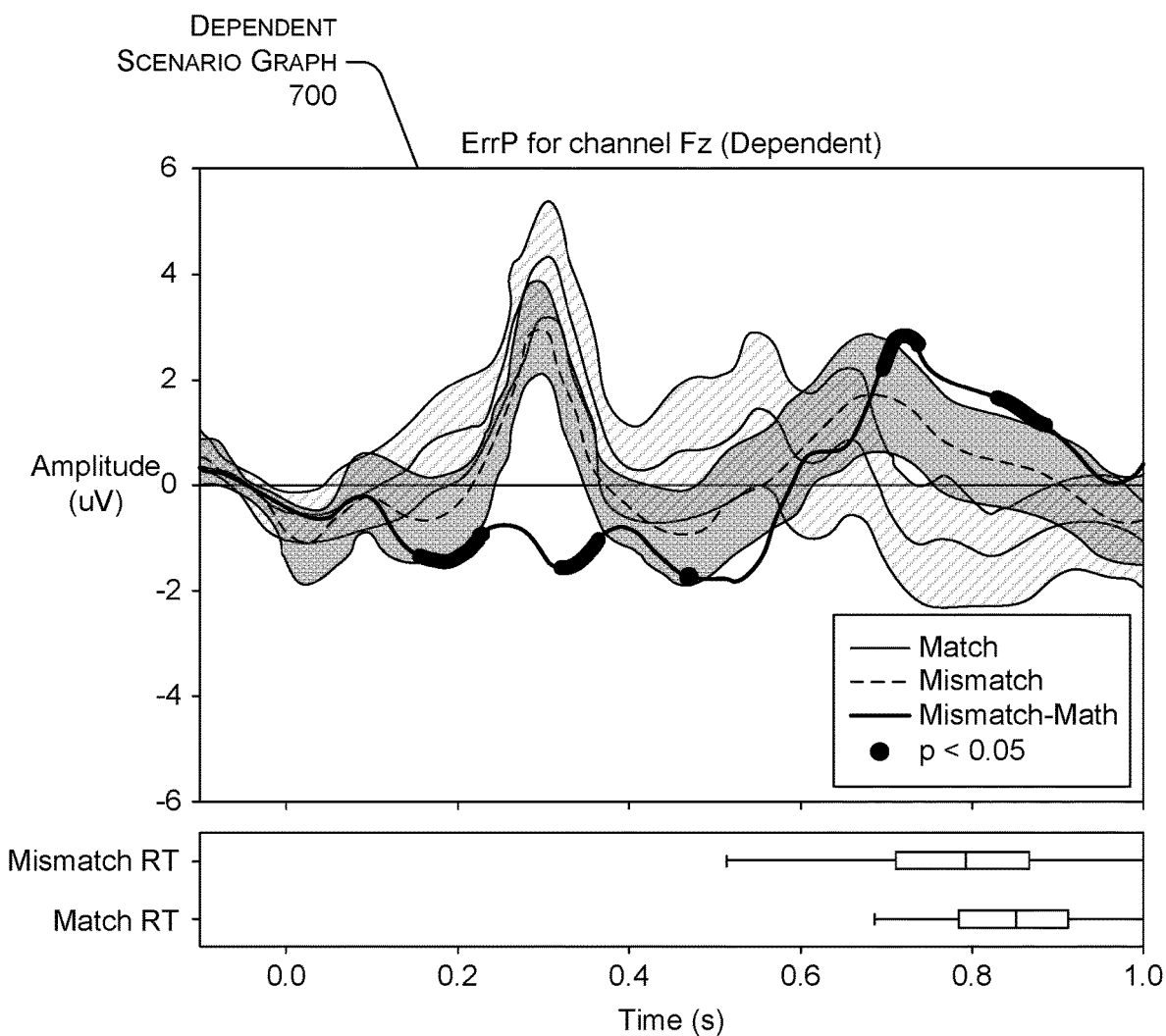

Data from the dependent user scenario only (when participants are most reliant on the text generations) was analyzed first to determine if an ErrP is evoked by mismatch text predictions. FIG. 7 shows a dependent scenario graph 700, which conveys the grand average Event-Related Potentials (ERPs) for match and mismatch conditions within this scenario, and the mismatch-match difference. In the difference ERP, note a broad negative deflection around 480 msec and a broad positive peak around 720 msec after text generation, both of which are ErrP features (Ferrez et al., "Error-Related EEG Potentials Generated During Simulated Brain-Computer Interaction," in IEEE Transactions on Biomedical Engineering, 2008, vol. 55, pp. 923-929), (Salazar- Gomez et al. "Correcting robot mistakes in real time using EEG signals," in 2017 IEEE International Conference on Robotics and Automation (ICRA), 2017, pp. 6570-6577). Preceding this are two positive peaks at about 250 and 390 msec (do not reach statistical significance according to the Wilcoxon signed rank test) and two negative peaks at about 170 and 320 msec (significant, $p<0.05$), again resembling the interaction ErrP finding from (Salazar-Gomez et al. "Correcting robot mistakes in real time using EEG signals," in 2017 IEEE International Conference on Robotics and Automation (ICRA), 2017, pp. 6570-6577).

Figure 8:
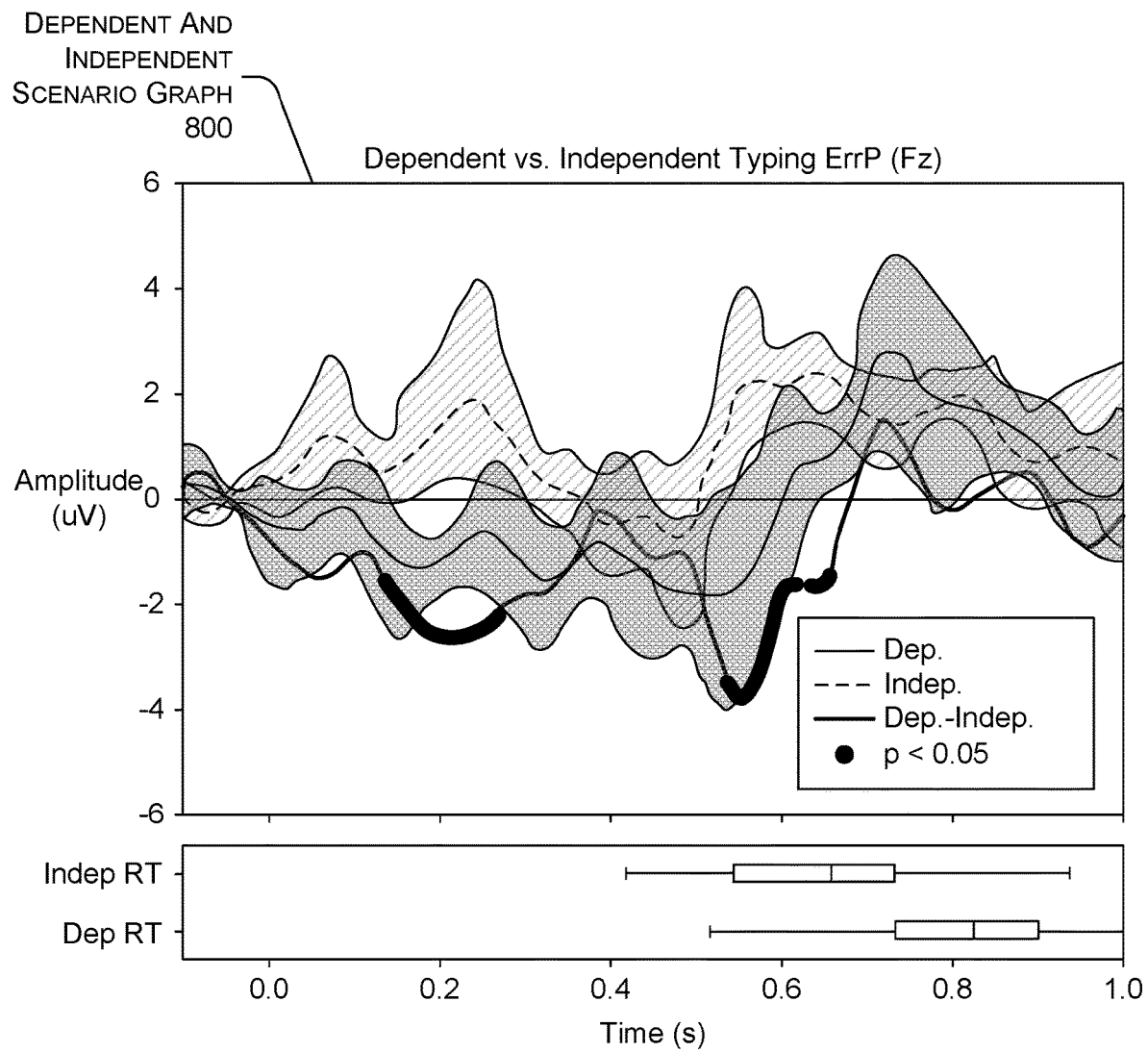

FIG. 8 shows a dependent and independent scenario graph 800 which shows compare the mismatch-minus-match difference when participants are in the dependent versus independent user scenarios. Since these two sets of trials differ in participants' reliance on the text generations to complete the task, it is reasonble to expect that there to also be a difference in how they perceive system errors. A Wilcoxon signed rank (WSR) test identifies two windows (140-260 msec and 540-650 msec) during which the dependent and independent ErrP differ significantly.

Pupil Dilation Response

Figure 9A:
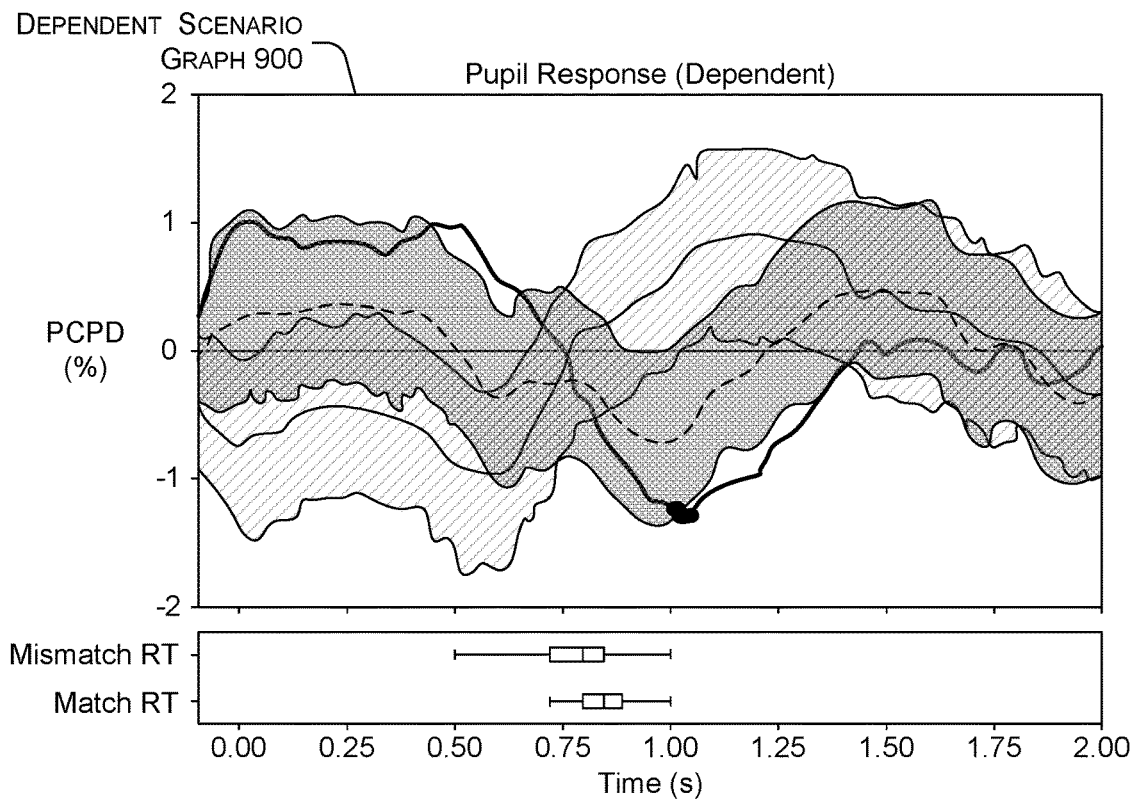
Figure 9B:
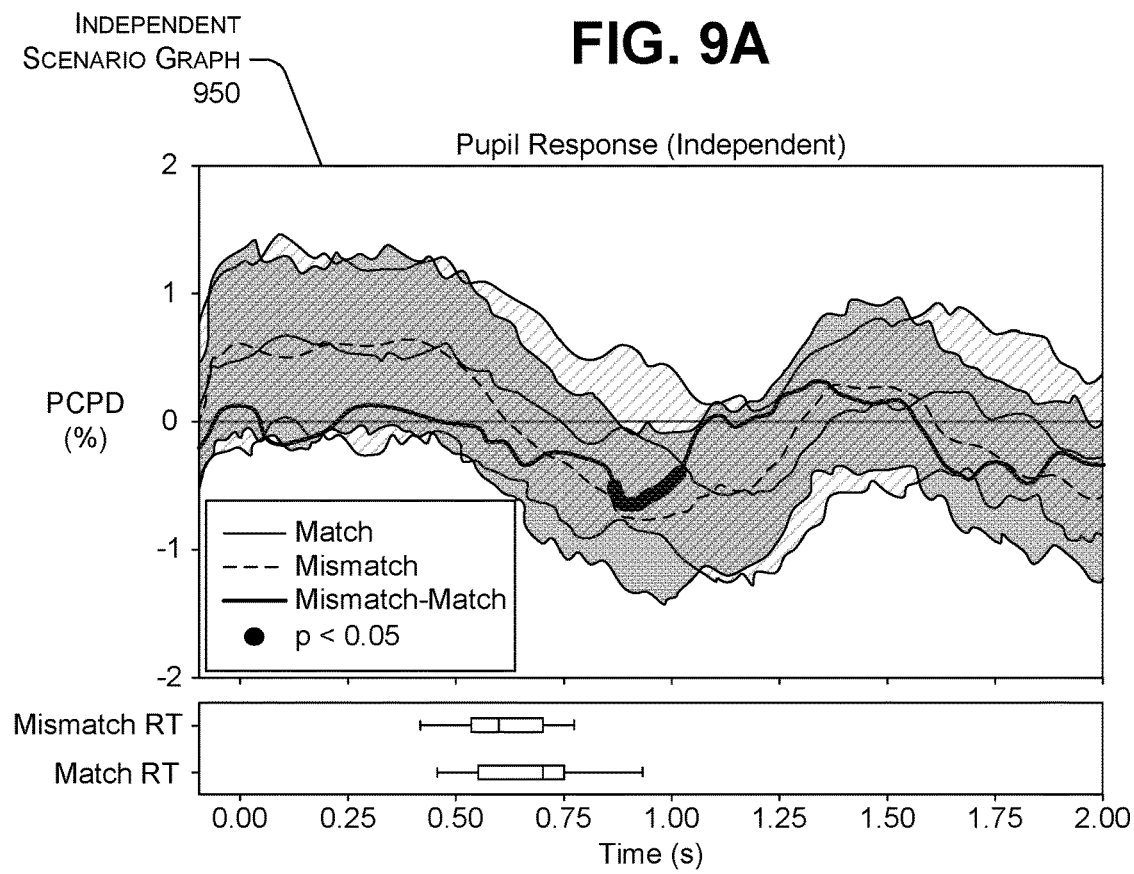

FIG. 9A shows participants' PCPD (1) averages from the dependent scenario via dependent scenario graph 900, and FIG. 9B shows PCPD averages for independent user scenarios via independent scenario graph 950. In the dependent scenario, before participants make any keyboard response, there is evidence of greater pupil dilation for generated mismatches, and constriction for matches (although this difference does not reach statistical significance according to the WSR test). In contrast, there is almost no difference between these conditions during this time in the independent scenario. After the keyboard response, consider an important detail for the dependent scenario: a generated match word will remain on the screen after the user responds with TAB, but a mismatch word will disappear when the user types the first letter of the correct word. It is possible that this visual difference could amount to a difference in luminance, making it unclear how much of the pupil response observed after participants' keypress in the dependent scenario is due to their perception of the generated text versus this potential confounder. However, it is worth noting that there are no such differences in visual presentation for the independent user scenario (regardless of if the generated word is a match or mismatch, participants always type the following letter, and the generated text always disappears from the display). However, the data still shows a slight difference in pupil response between conditions in the time after participants' keypress. This suggests that pupil diameter measurements, like EEG signals, can be employed to infer when users perceive an error in a given prediction.

Machine Learning Overview

There are various types of machine learning frameworks that can be trained to perform a given task, such as determining whether a user reaction signal indicates an error. Support vector machines, decision trees, and neural networks are just a few examples of machine learning frameworks that have been used in a wide variety of applications, such as image processing and natural language processing.

A support vector machine is a model that can be employed for classification or regression purposes. A support vector machine maps data items to a feature space, where hyperplanes are employed to separate the data into different regions. Each region can correspond to a different classification. Support vector machines can be trained using supervised learning to distinguish between data items having labels representing different classifications. One way to employ a support vector machine is for binary classification of user reaction signals to determine whether the use reaction signals indicate that a user perceives an error in a prediction made by a predictive model.

A decision tree is a tree-based model that represents decision rules using nodes connected by edges. Decision trees can be employed for classification or regression and can be trained using supervised learning techniques. Multiple decision trees can be employed in a random forest to significantly improve the accuracy of the resulting model. In a random forest, the collective output of the individual decision trees is employed to determine a final output of the random forest. For instance, in regression problems, the output of each individual decision tree can be averaged to obtain a final result. For classification problems, a majority vote technique can be employed, where the classification selected by the random forest is the classification selected by the most decision trees. One way to employ a decision tree or random forest is to classify user reaction signals as either indicating an error or no error perceived by a user in a given prediction.

A neural network is another type of machine learning model that can be employed for classification or regression tasks. In a neural network, nodes are connected to one another via one or more edges. A neural network can include an input layer, an output layer, and one or more intermediate layers. Individual nodes can process their respective inputs according to a predefined function, and provide an output to a subsequent layer, or, in some cases, a previous layer. The inputs to a given node can be multiplied by a corresponding weight value for an edge between the input and the node. In addition, nodes can have individual bias values that are also used to produce outputs. Neural networks can also be employed for classification of user reaction signals as indicating whether users perceive errors in predictions.

Various training procedures can be applied to learn the edge weights and/or bias values of a neural network. The term "internal parameters" is used herein to refer to learnable values such as edge weights and bias values that can be learned by training a machine learning model, such as a neural network. The term "hyperparameters" is used herein to refer to characteristics of model training, such as learning rate, batch size, number of training epochs, number of hidden layers, activation functions, etc.

A neural network structure can have different layers that perform different specific functions. For example, one or more layers of nodes can collectively perform a specific operation, such as pooling, encoding, decoding, alignment, prediction, or convolution operations. For the purposes of this document, the term "layer" refers to a group of nodes that share inputs and outputs, e.g., to or from external sources or other layers in the network. The term "operation" refers to a function that can be performed by one or more layers of nodes. The term "model structure" refers to an overall architecture of a layered model, including the number of layers, the connectivity of the layers, and the type of operations performed by individual layers. The term "neural network structure" refers to the model structure of a neural network. The term "trained model" and/or "tuned model" refers to a model structure together with internal parameters for the model structure that have been trained or tuned, e.g., individualized tuning to one or more particular users. Note that two trained models can share the same model structure and yet have different values for the internal parameters, e.g., if the two models are trained on different training data or if there are underlying stochastic processes in the training process.

Alternative Implementations

The discussion above focused on user gaze as an example of a user attention signal. However, in other implementations, EEG or other sensors can be used to infer spatial attention, audio, or tactile attention. For instance, consider a user gazing at a fixed position but shifting their peripheral vision to somewhere within field of view, a user using their ears to listen where the sound comes from (left or right), or a user that directs tactile attention to a particular finger that has received a stimulus. Additional details on spatial, auditory, and tactile attention can be found at An, et al. "Decoding auditory and tactile attention for use in an EEG-based brain-computer interface," In 2020 8th International Winter Conference on Brain-Computer Interface (BCI), IEEE, 2020. pp. 1-6.

In some cases, a user attention signal is not necessarily a biosignal, e.g., a user attention signal can be obtained without necessarily sensing the user at all. For instance, consider a spoken sentence that is output by a loudspeaker, where one of the words in the sentence is output by a prediction model. An inference can be made that the user is paying attention to each word as they are spoken. Thus, a user attention signal in this instance can be obtained using timestamps for each spoken word, and the user reaction signal immediately following the timestamp of the predicted word can be employed to evaluate the prediction.

The discussion above focused on two types of user reaction signals—EEG signals and pupillary diameter measurements. However, a broad range of biosignals can be used to infer whether a user perceives an error in a given prediction. For instance, other reaction signals could reflect a user's heart rate, heart rate variability (HRV), perspiration rate (e.g., via a photoplethysmography (PPG) sensor), blood pressure, body temperature, body fat, blood sugar, blood oxygenation, etc. In addition, facial expressions, gestures, movement dynamics, etc., could be correlated to user perception of errors in predictions generated by a predictive model. For instance, the acceleration component of a user gesture, obtained from an IMU, could be used to infer whether a user perceives an error. In some use cases, relatively high acceleration rates may imply that the user is agitated when they perceive an error in a prediction, and lower acceleration rates may imply that the user accepts the prediction. Furthermore, in some cases, a user's physiological response could indicate a positive reaction rather than a negative reaction, e.g., an EEG measurement could convey that a user accepts a particular prediction as being correct or accurate.

One way to determine which potential user reaction signals to employ involves training a classifier, such as a neural network, with multiple reaction signals and determining whether the machine-trained classifier improves accuracy when using a given reaction signal. For instance, consider a neural network with a fully-connected output layer that outputs a binary classification of one or more reaction signals into two classes-error and no error. For a given use case, each reaction signal can be used to train such a model to determine whether accuracy is improved for that use case. Thus, for instance, in predictive text scenarios, EEG and pupillary diameter measurements might improve model accuracy more than blood pressure or accelerometer measurements. For other use cases, e.g., evaluating user's reactions to a list of search results, different reaction signals could be useful for improving model accuracy. Note that rule-based, heuristic approaches are also contemplated, e.g., an increase in pupil diameter above a percentage threshold could be considered indicative of an error without the use of a machine-trained model.

Note also that a wide range of applications can employ the disclosed techniques. For instance, consider a query disambiguation scenario for a search engine, where a user enters the word "jaguar" and receives a list of search results that include both web pages relating to the cat species and web pages relating to the brand of vehicle. If an error is detected when the user gazes at a specific search result in the list relating to the vehicle, the list of search results could automatically be updated by the search engine to remove vehicle-related web pages in favor of web pages relating to the cat species.

As another example, consider a predictive model that aids a user with a targeting mechanism, e.g., for moving a cursor over a given object using a mouse, joystick, or hand gesture. If the user moves the cursor toward two closely-spaced objects, the predictive model could select one of the two objects and automatically move the cursor toward that object. In the event of an error in a reaction signal, the cursor could automatically be moved to the other object.

One important use case of the disclosed techniques involves evaluating different predictive models for a given application. Consider two different predictive text models, with different underlying structures (e.g., a transformer-based model and a long short-term memory-based model) or trained on different corpuses of training data. Both predictive text models might be able to generate predicted text for email applications as well as text messaging applications. However, as users may tend to use a different writing style or communicate with different people using email as opposed to text messages, one model might tend to be better suited for email and the other model might be better suited for text messaging.

One way to evaluate the two models would be to deploy both models to users and let users explicitly rate the predictive capabilities of both models in both email and text messaging scenarios. Given enough examples, eventually it will become clear which model users prefer for the email scenario and for the text messaging scenario. However, this approach involves collection of manual feedback from each user, which is cumbersome and expensive.

Another approach would be to determine which model is more accurate, e.g., based on user acceptance of predictions by each model. If users accept a higher percentage of predictions from one model in text scenarios and a higher percentage of predictions from the other model in email scenarios, then an inference can be made as to which model is better suited to each scenario. While this approach does not necessarily require explicit user ratings of each model, the users still need to accept or reject predictions by the lower-performing model for each scenario, which is still cumbersome and can lead to user frustration, particularly if the lower-performing model is much worse than the better-performing model for a given scenario.

Using the disclosed techniques, user reaction data can be collected in a wide range of computing scenarios involving not only text messaging and email usage, but also involving users that are concurrently using other applications or exposed to real-world distractions. The users do not necessarily need to explicitly reject predictions by a given model, since the implicit physiological reaction can be used to trigger replacing predictions when errors are detected. Consequently, user satisfaction even with lower-performing models can be improved while still collecting physiological data that can be employed to rank each model for a given scenario. Thus, for instance, one model can be selected for text messaging scenarios and the other model for email scenarios based on accuracy of predictions as inferred from physiological reactions of the users, rather than on explicit user ratings or explicit user acceptance/rejection of predictions by the two models.

Technical Effect

The disclosed concepts provide for automated evaluation of computer-generated predictions in the absence of explicit user input. As noted previously, one way to evaluate a user's reaction to a prediction is to determine whether the user's reaction indicates an error after the prediction is output by a computer, e.g., by being displayed to the user. However, in many situations, users do not immediately direct their attention to the prediction. Rather, users can be distracted by other computer-generated content or real-world stimuli. Thus, in some cases, the user's reaction immediately after a given prediction is output by a computer is not necessarily their reaction to the prediction itself, but potentially a reaction to other stimuli.

The disclosed concepts employ a user attention signal to determine when a user is directing attention to a given prediction. Then, a user reaction signal is evaluated to determine whether the user perceives an error in the prediction after the user has directed their attention to the prediction. Thus, even if the user is distracted when the prediction is initially output by the computer, a user reaction signal can be evaluated at the appropriate time to determine whether the user perceives an error in the prediction.

As a consequence, the disclosed techniques can be employed in a wide range of real-world computing scenarios. In contrast, prior approaches where user reactions were measured at the time a given prediction was output to the user had limited viability outside of constrained research scenarios where users were not subject to other computer-based or real-world distractions. Because the disclosed techniques can be employed in real-world computing scenarios, important use cases can benefit from the disclosed techniques. For instance, as noted above, the disclosed techniques enable real-time replacement of erroneous text predictions or search results, and also enable stack ranking of predictive models without requiring users to manually evaluate the models.

Device Implementations

As noted above with respect to FIG. 1, system 100 includes several devices, including a wearable device 110, a client device 120, a client device 130, and a server 140. As also noted, not all device implementations can be illustrated, and other device implementations should be apparent to the skilled artisan from the description above and below.

The term "device", "computer," "computing device," "client device," and or "server device" as used herein can mean any type of device that has some amount of hardware processing capability and/or hardware storage/memory capability. Processing capability can be provided by one or more hardware processors (e.g., hardware processing units/cores) that can execute computer-readable instructions to provide functionality. Computer-readable instructions and/or data can be stored on storage, such as storage/memory and or a datastore. The term "system" as used herein can refer to a single device, multiple devices, etc.

Storage resources can be internal or external to the respective devices with which they are associated. The storage resources can include any one or more volatile or non-volatile memory, hard drives, flash storage devices, and/or optical storage devices (e.g., CDs, DVDs, etc.), among others. As used herein, the term "computer-readable medium" can include signals. In contrast, the term "computer-readable storage medium" excludes signals. Computer-readable storage media includes "computer-readable storage devices." Examples of computer-readable storage devices include volatile storage media, such as RAM, and non-volatile storage media, such as hard drives, optical discs, and flash memory, among others.

In some cases, the devices are configured with a general-purpose hardware processor and storage resources. In other cases, a device can include a system on a chip (SOC) type design. In SOC design implementations, functionality provided by the device can be integrated on a single SOC or multiple coupled SOCs. One or more associated processors can be configured to coordinate with shared resources, such as memory, storage, etc., and/or one or more dedicated resources, such as hardware blocks configured to perform certain specific functionality. Thus, the term "processor," "hardware processor" or "hardware processing unit" as used herein can also refer to central processing units (CPUs), graphical processing units (GPUs), neural processing units (NPUs), controllers, microcontrollers, processor cores, or other types of processing devices suitable for implementation both in conventional computing architectures as well as SOC designs.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

In some configurations, any of the modules/code discussed herein can be implemented in software, hardware, and/or firmware. In any case, the modules/code can be provided during manufacture of the device or by an intermediary that prepares the device for sale to the end user. In other instances, the end user may install these modules/code later, such as by downloading executable code and installing the executable code on the corresponding device.

Also note that devices generally can have input and/or output functionality. For example, computing devices can have various input mechanisms such as keyboards, mice, touchpads, voice recognition, gesture recognition (e.g., using depth cameras such as stereoscopic or time-of-flight camera systems, infrared camera systems, RGB camera systems or using accelerometers/gyroscopes, facial recognition, etc.). Devices can also have various output mechanisms such as printers, monitors, etc.

Also note that the devices described herein can function in a stand-alone or cooperative manner to implement the described techniques. For example, the methods and functionality described herein can be performed on a single computing device and/or distributed across multiple computing devices that communicate over network(s) 150. Without limitation, network(s) 150 can include one or more local area networks (LANs), wide area networks (WANs), the Internet, and the like.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and other features and acts that would be recognized by one skilled in the art are intended to be within the scope of the claims.

Various examples are described above. Additional examples are described below. One example includes a method comprising receiving a user attention signal conveying where a user directs attention over a period of time, based on the user attention signal, identifying a particular time when the user directs attention to a prediction output by a predictive model, receiving a user reaction signal conveying a physiological reaction of the user to the prediction, determining whether the physiological reaction indicates that the user perceives an error responsive to directing attention to the prediction, and in an instance when the physiological reaction indicates that the user perceives an error, outputting an error indication.

Another example can include any of the above and/or below examples where the user attention signal indicates where the user is gazing during the period of time.

Another example can include any of the above and/or below examples where the user reaction signal comprises an electroencephalogram signal.

Another example can include any of the above and/or below examples where the method further comprises determining that the electroencephalogram signal indicates that the user perceives an error when the electroencephalogram signal includes an error-related potential occurring after the particular time when the user directs attention to the prediction.

Another example can include any of the above and/or below examples where the error-related potential occurs within one second after the particular time when the user directs attention to the prediction.

Another example can include any of the above and/or below examples where the user reaction signal comprises a pupil diameter measurement.

Another example can include any of the above and/or below examples where the method further comprises evaluating and ranking multiple predictive models based on user attention signals and user reaction signals relating to multiple predictions output by the multiple predictive models.

Another example can include any of the above and/or below examples where determining whether the physiological reaction indicates that the user perceives an error comprises applying a rule to the user reaction signal.

Another example can include any of the above and/or below examples where determining whether the physiological reaction indicates that the user perceives an error comprises applying a machine-trained classifier to the user reaction signal.

Another example can include any of the above and/or below examples where the method further comprises tuning the machine-trained classifier to the user.

Another example can include any of the above and/or below examples where the machine-trained classifier comprises a deep neural network.

Another example includes a system comprising a processor and a computer-readable storage medium storing instructions which, when executed by the processor, cause the system to: output a prediction, receive an error indication indicating that a user perceives an error in the prediction, the error indication being based on a user attention signal indicating that the user directs attention to the prediction at a particular time and a user reaction signal indicating that the user perceives an error responsive to directing attention to the prediction, and based on the error indication, replace the prediction with another prediction.

Another example can include any of the above and/or below examples where the prediction comprises a predicted word and the another prediction comprises another predicted word.

Another example can include any of the above and/or below examples where the predicted word has a highest score assigned by a generative text model, and the another predicted word has a next-highest score assigned by the generative text model.

Another example can include any of the above and/or below examples where the user attention signal indicates that the user is gazing at the predicted word.

Another example can include any of the above and/or below examples where the system further comprises an eye tracking sensor configured to generate the user attention signal.

Another example can include any of the above and/or below examples where the system further comprises an electroencephalogram sensor configured to generate the user reaction signal.

Another example can include any of the above and/or below examples where the system further comprises an eye tracking sensor configured to generate the user reaction signal based on pupil diameter.

Another example includes a computer-readable storage medium storing instructions which, when executed by a computing device, cause the computing device to perform acts comprising: receiving a user attention signal conveying where a user directs attention over a period of time, based on the user attention signal, identifying a particular time when the user directs attention to a prediction output by a predictive model, receiving a user reaction signal conveying a physiological reaction of the user to the prediction, determining whether the physiological reaction indicates that the user perceives an error responsive to directing attention to the prediction, and in an instance when the physiological reaction indicates that the user perceives an error, outputting an error indication.

Another example can include any of the above and/or below examples where the user attention signal indicating that the user gazes at the prediction at the particular time, the user reaction signal indicating an error-related potential occurring within a specified time window after the particular time.

The invention claimed is:

1. A method comprising:
   receiving a user attention signal conveying where a user directs attention over a period of time;
   based on the user attention signal, identifying a particular time when the user directs attention to a prediction output by a predictive model;
   receiving a user reaction signal conveying a physiological reaction of the user to the prediction;
   determining whether the physiological reaction indicates that the user perceives an error responsive to directing attention to the prediction; and
   in an instance when the physiological reaction indicates that the user perceives an error, outputting an error indication.

2. The method of claim 1, wherein the user attention signal indicates where the user is gazing during the period of time.

3. The method of claim 2, wherein the user reaction signal comprises an electroencephalogram signal.

4. The method of claim 3, further comprising determining that the electroencephalogram signal indicates that the user perceives an error when the electroencephalogram signal includes an error-related potential occurring after the particular time when the user directs attention to the prediction.

5. The method of claim 4, wherein the error-related potential occurs within one second after the particular time when the user directs attention to the prediction.

6. The method of claim 2, wherein the user reaction signal comprises a pupil diameter measurement.

7. The method of claim 1, further comprising evaluating and ranking multiple predictive models based on user attention signals and user reaction signals relating to multiple predictions output by the multiple predictive models.

8. The method of claim 1, wherein determining whether the physiological reaction indicates that the user perceives an error comprises applying a rule to the user reaction signal.

9. The method of claim 1, wherein determining whether the physiological reaction indicates that the user perceives an error comprises applying a machine-trained classifier to the user reaction signal.

10. The method of claim 9, further comprising tuning the machine-trained classifier to the user.

11. The method of claim 10, the machine-trained classifier comprising a deep neural network.

12. A system comprising:
a processor; and
a computer-readable storage medium storing instructions which, when executed by the processor, cause the system to:
output a prediction;
receive an error indication indicating that a user perceives an error in the prediction, the error indication being based on a user attention signal indicating that the user directs attention to the prediction at a particular time and a user reaction signal indicating that the user perceives an error responsive to directing attention to the prediction; and
based on the error indication, replace the prediction with another prediction.

13. The system of claim 12, wherein the prediction comprises a predicted word and the another prediction comprises another predicted word.

14. The system of claim 13, wherein the predicted word has a highest score assigned by a generative text model, and the another predicted word has a next-highest score assigned by the generative text model.

15. The system of claim 14, wherein the user attention signal indicates that the user is gazing at the predicted word.

16. The system of claim 15, further comprising an eye tracking sensor configured to generate the user attention signal.

17. The system of claim 12, further comprising an electroencephalogram sensor configured to generate the user reaction signal.

18. The system of claim 12, further comprising an eye tracking sensor configured to generate the user reaction signal based on pupil diameter.

19. A computer-readable storage medium storing instructions which, when executed by a computing device, cause the computing device to perform acts comprising:
receiving a user attention signal conveying where a user directs attention over a period of time;
based on the user attention signal, identifying a particular time when the user directs attention to a prediction output by a predictive model;
receiving a user reaction signal conveying a physiological reaction of the user to the prediction;
determining whether the physiological reaction indicates that the user perceives an error responsive to directing attention to the prediction; and
in an instance when the physiological reaction indicates that the user perceives an error, outputting an error indication.

20. The computer-readable storage medium of claim 19, the user attention signal indicating that the user gazes at the prediction at the particular time, the user reaction signal indicating an error-related potential occurring within a specified time window after the particular time.

* * * * *